United States Patent [19]

Itoh et al.

[11] Patent Number: 5,245,542
[45] Date of Patent: Sep. 14, 1993

[54] SYSTEM FOR CONTROLLING THE OUTPUT POWER OF MOTOR VEHICLE

[75] Inventors: Masayoshi Itoh; Susumu Nishikawa; Yasunobu Miyata, all of Aichi, Japan

[73] Assignee: Mitsubishi Jidosha Kogyo Kabushiki Kaisha, Tokyo, Japan

[21] Appl. No.: 661,293

[22] Filed: Feb. 27, 1991

[30] Foreign Application Priority Data

Feb. 27, 1990 [JP] Japan .................................. 2-44461

[51] Int. Cl.$^5$ ............................................ B60K 28/16
[52] U.S. Cl. ................................. 364/426.02; 180/197
[58] Field of Search ................... 364/426.02, 426.03; 180/197; 303/97, 99, 103, 95, 100

[56] References Cited

U.S. PATENT DOCUMENTS

| | | | |
|---|---|---|---|
| 4,637,487 | 1/1987 | Nakamura et al. | 180/197 |
| 4,848,851 | 7/1989 | Kuraoka et al. | 364/426.02 |
| 4,985,837 | 1/1991 | Togai et al. | 364/426.02 |
| 4,985,838 | 1/1991 | Hashiguchi et al. | 364/426.02 |
| 5,018,595 | 5/1991 | Hara et al. | 180/197 |
| 5,024,285 | 6/1991 | Fujita | 180/197 |
| 5,130,929 | 7/1992 | Shiraishi et al. | 364/426.02 |

*Primary Examiner*—Gary Chin

[57] ABSTRACT

A motor vehicle output power control system effects a slip control process for preventing the drive wheels of a motor vehicle from slipping against unstable maneuverability and a trace control process for preventing the motor vehicle from failing to make a turn due to an excessive lateral acceleration. The motor vehicle output power control system has a torque control unit for reducing the drive torque produced by the engine irrespective of controlling action of the driver. A target speed for the drive wheels is established on the basis of the motor vehicle speed, and a reference drive torque for the engine is set depending on the target speed for the drive wheels. Based on a slip of the drive wheels, a target drive torque for the engine is established. The torque control unit is controlled by an electronic controller so that the drive torque produced by the engine is equalized to the target drive torque. The reference drive torque is corrected on the basis of the slip of the drive wheels, thus calculating the target drive torque. The drive torque of the engine can be quickly lowered in order not to unduly exceed maximum frictional forces between the road surface and the drive wheels. The motor vehicle is controlled by the motor vehicle output power control system to run safely with improved control responses because of a reduced number of corrective factors for control.

30 Claims, 22 Drawing Sheets

| GEARS | $\rho_{KI}$ | $\rho_{KP}$ | $\rho_{KD}$ |
|---|---|---|---|
| 1 ST | 1.0 | 1.0 | 1.0 |
| 2 ND | 0.5 | 0.4 | 0.4 |
| 3 RD | 0.5 | 0.2 | 0.2 |
| 4 TH | 0.5 | 0.2 | 0.2 |
| REVERSE | 1.0 | 0.8 | 0.8 |

SYSTEM FOR CONTROLLING THE OUTPUT POWER OF MOTOR VEHICLE

BACKGROUND OF THE INVENTION

The present invention relates to a system for controlling the output power of a motor vehicle such as an automobile, for example.

Road conditions abruptly vary from time to time while a motor vehicle is running, or a motor vehicle often runs on slippery road surfaces with low coefficients of friction, such as snow- or ice-covered roads. In such cases, the drive wheels of the motor vehicle are apt to spin, making it difficult for the driver to control the motor vehicle.

One practical way of getting the motor vehicle under control in such conditions is for the driver to adjust the depression of the accelerator pedal for controlling the output power of the engine so that the drive wheels do not spin. However, even highly skilled drivers find it difficult to make fine accelerator pedal adjustments while driving.

There has been proposed a motor vehicle output power control system for detecting a spinning condition of a drive wheel of a motor vehicle and forcibly lowering the output power of the engine on the motor vehicle irrespective of the depression by the driver of the accelerator pedal if the driven wheel spins. The driver can select a control mode in which the motor vehicle output control mode is in operation to control the output power of the engine, or a normal mode in which the output power of the engine is controlled solely depending on how deeply the accelerator pedal is depressed.

According to known principles of such a motor vehicle output power control system, the rotational speeds of drive and driven wheels are detected with the difference between the detected rotational speeds being regarded as a slip of the drive wheel, and the drive torque produced by the engine is controlled depending on the slip. More specifically, the road conditions are estimated on the basis of a change in the rotation of the driven wheels, and a reference drive torque is established for the engine under the estimated road conditions. The established reference drive torque is then corrected on the basis of the difference between the rotational speeds of the drive and driven wheels so that the drive torque produced by the engine will be equalized to the corrected reference drive torque.

However, since actual road conditions vary from road to road, it would be highly difficult in practice to make accurate estimates of the coefficients of friction of road surfaces with respect to the tires of the wheels. Therefore, it is necessary to employ many corrective factors to establish control conditions. Use of many corrective factors results in a complex control program, which is responsible for a control delay and an increase in the cost of the arithmetic unit of the motor vehicle output power control system.

SUMMARY OF THE INVENTION

It is an object of the present invention to provide a motor vehicle output power control system and method which reduces an energy loss for allowing a motor vehicle to run safely, and reduces the number of corrective factors in a control program for the prevention of a control delay.

Another object of the present invention is to provide a motor vehicle output power control system which can control the output power of a motor vehicle highly and accurately depending on the running resistance that the wheels of the motor vehicle receive from the road.

Still another object of the present invention is to provide a motor vehicle output power control system which allows a motor vehicle to turn smoothly.

A motor vehicle output power control system according to an embodiment of the present invention allows a motor vehicle to run safely while reducing any energy loss, and can particularly improve a control response. The motor vehicle output power control system comprises torque control means, target drive wheel speed setting means, reference drive torque setting means, slip detecting means, target drive torque setting means, and electronic control means. The motor vehicle output power control system may further comprise accelerating condition detecting means, turning condition detecting means, and turn target drive torque setting means.

The torque control means can lower the drive torque produced by an engine independently of controlling action of the driver of the motor vehicle, and may comprise means for retarding ignition timing, reducing the rate of intake air, or interrupting the supply of fuel.

The target drive wheel speed setting means establishes a target speed for drive wheels of the motor vehicle based on a running speed of the motor vehicle.

The target speed for the drive wheels may be corrected on the basis of turning condition information from the turning condition detecting means. The turning condition detecting means may employ a lateral acceleration based on the running speed and a steering angle of the motor vehicle as the turning condition information.

The reference drive torque setting means sets the reference drive torque depending on the target speed for the drive wheels which is established by the target drive wheel speed setting means.

The reference drive torque setting means may comprise reference drive wheel acceleration calculating means for calculating a reference acceleration for the drive wheels based on the target speed for the drive wheels, and means for calculating the reference drive torque based on the reference acceleration for the drive torque.

Alternatively, the reference drive torque setting means may set the reference drive torque to a value between predetermined upper and lower limit values.

reference drive torque setting means may correct the reference drive torque depending on accelerating condition information from the accelerating condition detecting means.

The reference drive torque setting means may correct the reference drive torque depending on a running resistance of the motor vehicle.

The reference drive torque setting means may correct the reference drive torque depending on the turning condition information detected by the turning condition detecting means. The turning condition detecting means may calculate a lateral acceleration based on the running speed and the steering angle of the motor vehicle, as the turning condition information.

The slip detecting means detects a slip of the drive wheels based on the target speed for the drive wheels.

The target drive torque setting means calculates a corrective torque based on the slip of the drive wheels, and corrects the reference drive torque with the corrective torque, thereby establishing the target drive torque. The target drive torque setting means may set the corrective torque based on at least one of a proportional value, a differentiated value, and an integrated value of the slip.

Alternatively, the turn target drive torque setting means may establish a turn target drive torque, and the target drive torque setting means may select either one of the reference drive torque and the turn target drive torque and establish the selected torque as the target drive torque.

The electronic control means controls the torque control means to equalize the drive torque produced by the engine to the target drive torque.

In the motor vehicle output power control system according to an embodiment of the present invention, the target drive wheel speed setting means establishes the target speed for the drive wheels based on the motor vehicle speed, and the reference drive torque setting means establishes the reference drive torque based on the target speed for the drive wheels. The slip detecting means calculates the slip of the drive wheels based on the target speed for the drive wheels, and the target drive torque setting means corrects the reference drive torque based on the slip of the drive wheels, thus establishing the target drive torque. Since the drive torque required for a slip control process is appropriately established on the basis of the reference drive torque, the accuracy and response of the control process are improved.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
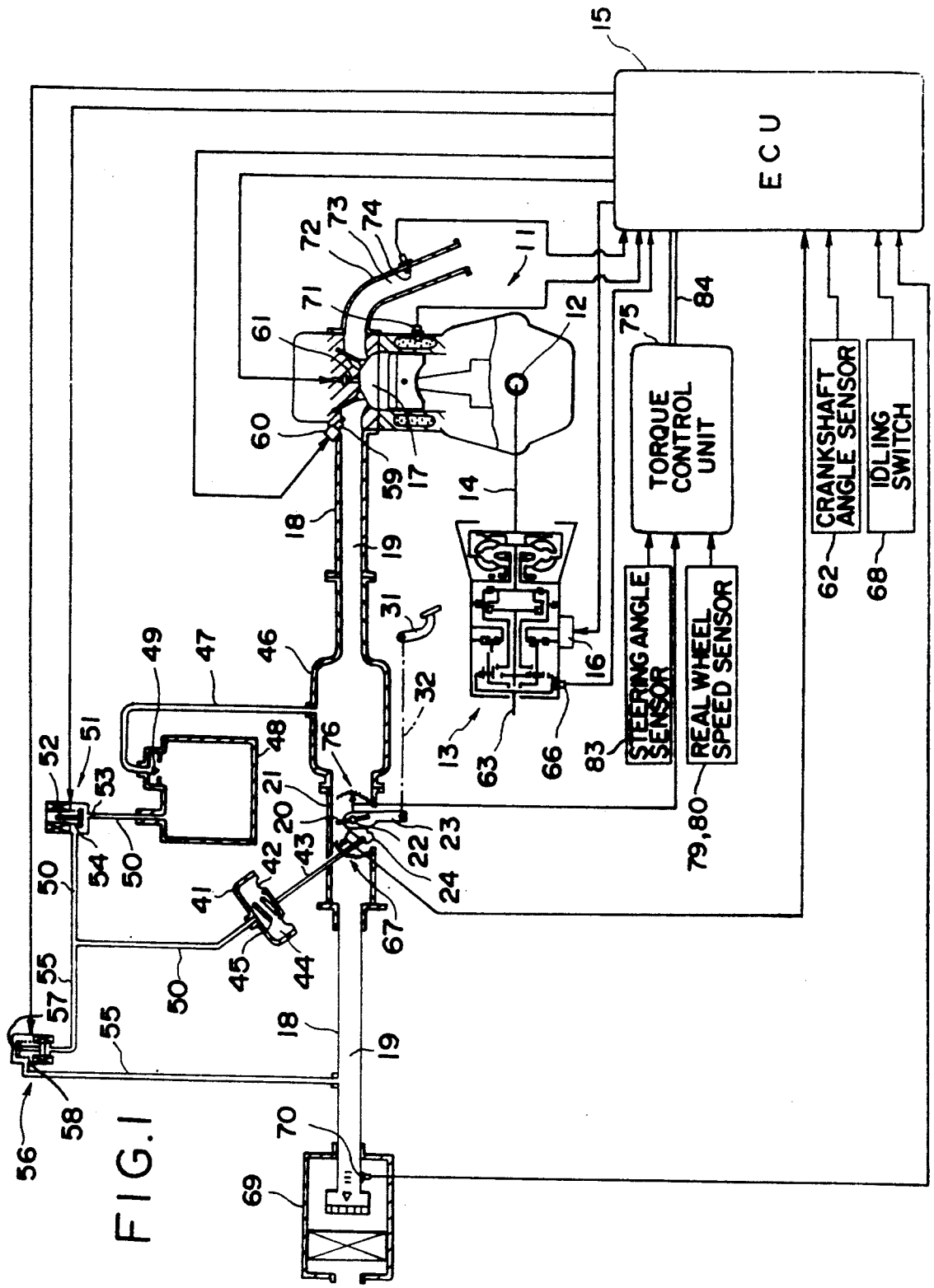
FIG. 1 is a block diagram, partly in cross section, of a motor vehicle output power control system according to an embodiment of the present invention, which is incorporated in a front-wheel-drive motor vehicle having a hydraulic automatic transmission with four forward gear positions and one reverse gear position.
Figure 2:
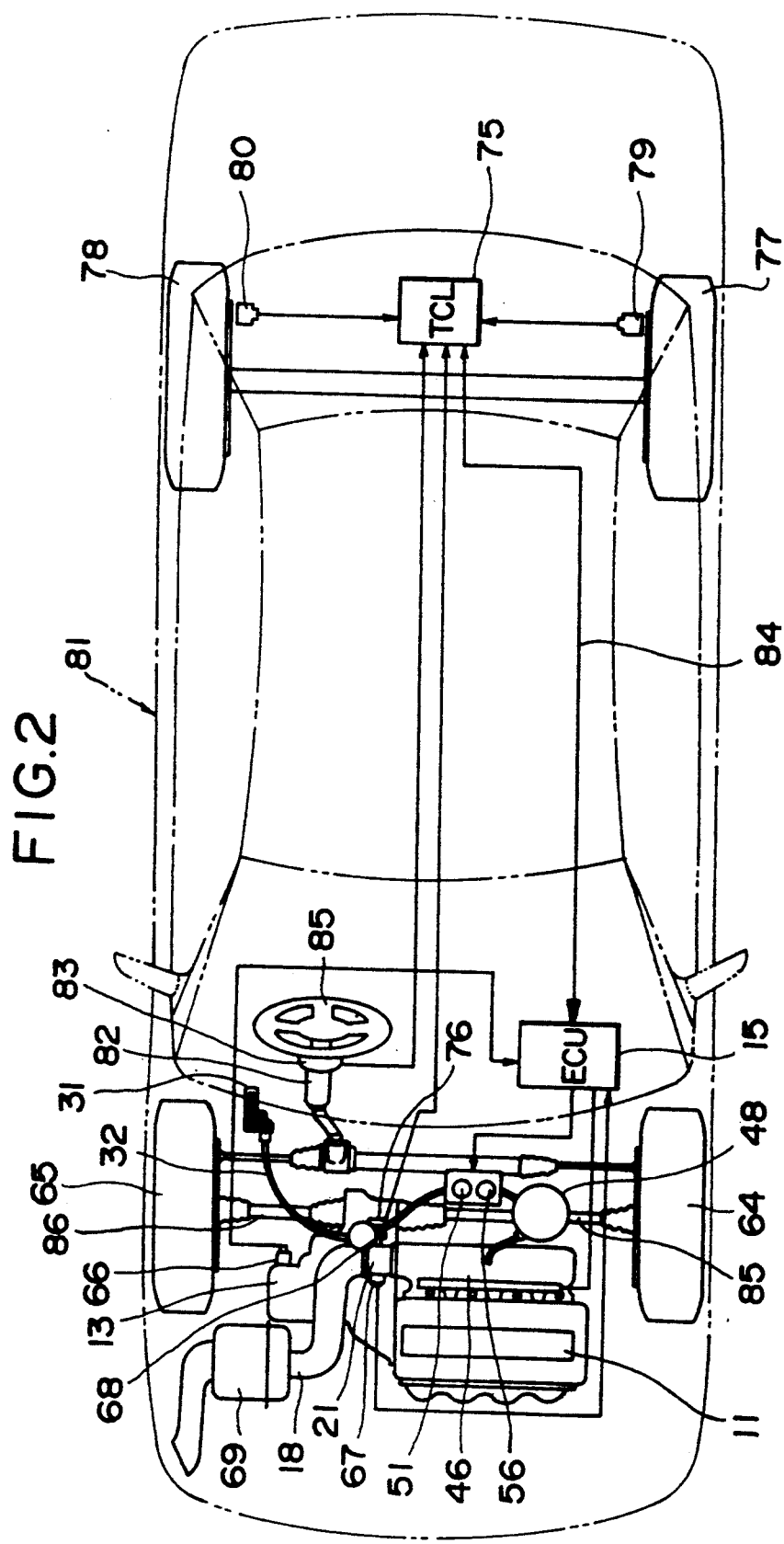
FIG. 2 is plan view of the motor vehicle which incorporates the motor vehicle output power control system shown in FIG. 1.

FIG. 1 shows a motor vehicle output power control system according to an embodiment of the present invention, which is incorporated in a front-wheel-drive motor vehicle such as an automobile, having a hydraulic automatic transmission with four forward gear positions and one reverse gear position. The motor vehicle is schematically indicated at 81 in FIG. 2.

The motor vehicle has an internal combustion engine 11 whose output shaft 12 is connected to the input shaft 14 of a hydraulic automatic transmission 13. The hydraulic automatic transmission 13 is actuated to automatically select a gear position by a hydraulic control device 16 which is controlled by a control signal from an electronic control unit (ECU) 15 that controls operation of the engine 11 depending on the position of the gearshift (not shown) which is selected by the driver and also on operating conditions of the motor vehicle. The specific structure and operation of the hydraulic automatic transmission 13 are well known from Japanese Laid-Open Patent Publications Nos. 58(1983)-54270 and 61(1986)-31749, for example. The hydraulic control device 16 contains a pair of gearshift control solenoid-operated valves (not shown) for engaging and disengaging a plurality of frictional engaging elements of the hydraulic automatic transmission 13. The energization and de-energization of these gearshift control solenoid-operated valves are controlled by the ECU 15 for smoothly selecting one, at a time, of the four forward gear positions and the single reverse gear position.

Figure 3:
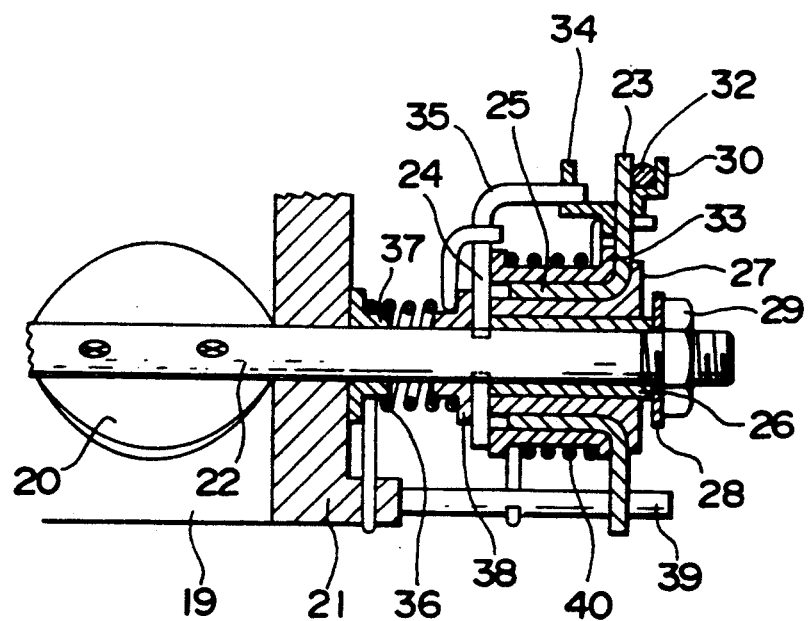
FIG. 3 is a cross-sectional view of an actuator mechanism for a throttle valve in the motor vehicle output power control system shown in FIG. 1.

The engine 11 has a plurality of, e.g., four, combustion chambers 17 (only one shown) each communicating with an intake pipe 18 which includes a throttle body 21 housing a throttle valve 20 for varying the opening of an intake passage 19 defined in the intake pipe 18 to regulate the rate of intake air to be supplied into the combustion chamber 17. As shown in FIGS. 1 and 3, the throttle valve 20 is fixed to a shaft 22 which is angularly movably and supported at its opposite end in the throttle body 21. One end of the shaft 22 projects out of the intake pipe 18 and supports an accelerator lever 23 and a throttle lever 24 which are coaxially coupled to the shaft 22.

Between the shaft 22 and a tubular portion 25 of the accelerator lever 23, there are interposed a bushing 26 and a spacer 27 which allow the accelerator lever 23 to be rotatable around and with respect to the shaft 22. The accelerator lever 23 is retained on the shaft 22 against removal therefrom by a washer 28 and a nut 29 which are mounted on the projecting end of the shaft 22. The accelerator lever 23 has an integral cable retainer 30 to which an accelerator pedal 31 that can be depressed by the driver of the motor vehicle is connected through a cable 32. Therefore, the accelerator lever 23 is angularly movable about and with respect to the shaft 22 through an angle depending on the depression of the accelerator pedal 31.

The throttle lever 24 is fixed to the shaft 22 for rotation therewith, so that angular movement of the throttle lever 24 causes the shaft 22 to turn the throttle valve 20 about the axis of the shaft 22. A collar 33 is coaxially fitted over the tubular portion 25 of the accelerator lever 23. The throttle lever 24 has a stopper 35 on a radially outer end thereof for engaging a finger 34 on the collar 33. The finger 34 and the stopper 35 are mutually positioned such that they engage each other when the throttle lever 24 is turned in a direction to open the throttle valve 20 or the accelerator lever 23 is turned in a direction to close the throttle valve 20.

A torsion coil spring 36 acts between the throttle body 21 and the throttle lever 24 for normally urging the stopper 35 into pushing engagement with the finger 34 in order to open the throttle valve 20. The torsion coil spring 36 is coaxially disposed around the shaft 22 and supported on tubular spring supports 37, 38 fitted over the shaft 22. Another torsion coil spring 40 acts between a stopper pin 39 mounted on the throttle body 21 and the accelerator lever 23 for normally urging the finger 34 to be pressed against the stopper 35 in order to close the throttle valve 20, thereby biasing the accelerator pedal 31 as with a detent. The torsion coil spring 40 is disposed about the collar 33 on the tubular portion 25 in coaxial relation to the shaft 22.

To the radially outer end of the throttle lever 24, there is coupled an end of a control rod 43 which is fixed to a diaphragm 42 of an actuator 41. The actuator 41 has a pressure chamber 44 defined therein and housing a compression coil spring 45 which urges, in combination with the torsion coil spring 36, the stopper 35 to be pressed against the finger 34 in order to open the throttle valve 20. The spring force of the torsion coil spring 40 is selected to be larger than the combined spring force of the springs 36, 45, so that the throttle valve 20 cannot be opened unless the accelerator pedal 31 is depressed.

The intake passage 19 includes a surge tank 46 coupled to a downstream side of the throttle body 21. A vacuum tank 48 is connected through a joint pipe 47 to the surge tank 46. A check valve 49 for allowing air to flow only from the vacuum tank 48 to the surge tank 46 is disposed between the vacuum tank 48 and the joint pipe 47, thereby maintaining a vacuum pressure in the vacuum tank 48, which is approximately equal to the minimum pressure in the surge tank 46.

The interior of the vacuum tank 48 and the pressure chamber 44 of the actuator 41 are held in communication with each other through a pipe 50 which has a first torque control solenoid-operated valve 51 that is closed when de-energized. The first torque control solenoid-operated valve 51 has a plunger 52 which is normally urged against a valve seat 53 by a spring 54 thereby to close the pipe 50.

A pipe 55, communicating with the intake passage 19 upstream of the throttle valve 20, is connected to the pipe 50 between the first torque control solenoid-operated valve 51 and the actuator 41. The pipe 55 has a second torque control solenoid-operated valve 56 which is open when de-energized. The second torque control solenoid-operated valve 56 has a plunger 57 which is normally urged by a spring 58 to open the pipe 55.

The first and second torque control solenoid-operated valves 51, 56 are electrically connected to the ECU 15 which applies control signals to control the energization and de-energization, or the duty ratio, of these solenoid-operated valves 51, 56. The ECU 15 and the first and second torque control solenoid-operated valves 51, 56 jointly serve as a torque lowering device.

When the duty ratio of the torque control solenoid-operated valves 51, 56 is 0%, then the pressure in the pressure chamber 44 of the actuator 41 is the atmospheric pressure which is substantially the same as the pressure in the intake passage 19 upstream of the throttle valve 20. At this time, therefore, the opening of the throttle valve 20 is directly proportional to, or in one-to-one correspondence to, the depression of the accelerator pedal 31. When the duty ratio of the torque control solenoid-operated valves 51, 56 is 100%, the pressure in the pressure chamber 44 of the actuator 41 is a vacuum which is substantially the same as the pressure in the vacuum tank 48. The control rod 43 is pulled obliquely upwardly (FIG. 1), thereby closing the throttle valve 20 irrespective of the depression of the accelerator pedal 31, so that the drive torque produced by the engine 11 is forcibly reduced. By thus adjusting the duty ratio of the torque control solenoid-operated valves 51, 56, the opening of the throttle valve 20 can be varied regardless of the depression of the accelerator pedal 31, thereby adjusting the drive torque of the engine 11 as desired.

In this embodiment, the opening of the throttle valve 20 is controlled simultaneously by the accelerator pedal 31 and the actuator 41. However, two throttle valves may be disposed in series in the intake passage 19, one throttle value connected to only the accelerator pedal 31 and the other throttle valve connected to only the actuator 41, so that the two throttle valves can be controlled independently.

The downstream end of the intake pipe 18 has as many fuel injection nozzles 59 as the number of cylinders (e.g., four cylinders) of the engine 11. The fuel injection nozzles 59 serve to inject fuel into the respective combustion chambers 17. Each of the fuel injection nozzles 59 is supplied with fuel through a solenoid-operated valve 60 whose duty ratio is controlled by the ECU 15. When the time is controlled by the ECU 15 during which the solenoid-operated valve 60 is open the rate of fuel to be supplied to the combustion chamber 17 is regulated to supply the fuel into the combustion chamber 17 at a desired air-fuel ratio. The fuel supplied into the combustion chamber 17 is ignited by a spark plug 61.

To the ECU 15, there are electrically connected a crankshaft angle sensor 62 attached to the engine 11 for detecting the rotational speed of the engine 11, a front wheel speed sensor 66 for detecting the rotational speed of the output shaft 63 of the hydraulic automatic transmission 13 to determine the average peripheral speed of a pair of front drive wheels 64, 65 of the motor vehicle 82, a throttle opening sensor 67 mounted on the throttle body 21 for detecting the opening of the throttle lever 24, an idling switch 68 mounted on the throttle body 21 for detecting a fully closed condition of the throttle valve 20, an air flow sensor 70, such as a Karman vortex air flow sensor, disposed in an air cleaner 69 at the distal end of the intake passage 18 for detecting the rate of air flowing into the combustion chambers 17 of the engine 11, a coolant temperature sensor 71 attached to the engine 11 for detecting the temperature of a coolant in the engine 11, and an exhaust temperature sensor 74 mounted on an exhaust pipe 72 for detecting the temperature of exhaust gases flowing through an exhaust passage 73 defined in the exhaust pipe 72.

Output signals from the crankshaft angle sensor 62, the front wheel speed sensor 66, the throttle opening sensor 67, the idling switch 68, the air flow sensor 70, the coolant temperature sensor 71, the exhaust temperature sensor 74, and the ignition key switch 75 are supplied to the ECU 15.

To a torque calculating unit (TCL) 75 for calculating a target drive torque for the engine 11, there are connected an accelerator opening sensor 76 mounted on the throttle body 21 for detecting the opening of the accelerator lever 23, a pair of rear wheel speed sensors 79, 80 for detecting the rotational speeds of respective rear driven wheels 77, 78 of the motor vehicle 81, and a steering angle sensor 83 for detecting the angle through which a steering shaft 82 is turned from a reference angular position in which the motor vehicle 81 runs straight. Output signals from these sensors 76, 79, 80, 83 are applied to the TCL 75.

The ECU 15 and the TCL 75 are connected to each other through a communication cable 84. The ECU 15 transmits, over the communication cable 84, information about operating conditions of the engine 11, such as the engine speed, the rotational speed of the output shaft 63 of the hydraulic automatic transmission 13, the detected signal from the idling switch 68, etc., to the TCL 76. The TCL 75 sends, over the communication cable 84, information relative to a target drive torque calculated by the TCL 75 and a retard ratio of ignition timing, to the ECU 15.

The TCL 75 calculates a target drive torque for the engine 11 in a slip control process and a target drive torque for the engine 11 in a turn control process, selects an optimum final target drive torque from the above two target drive torques, and lowers the drive torque of the engine 11 as necessary. The output power produced by the engine 11 may not be reduced quickly enough even if the throttle valve 20 is fully closed by the actuator 41. In view of such a possible problem, the TCL 75 establishes a target retard for ignition timing for quick reduction of the drive torque produced by the engine 11.

Figure 4:
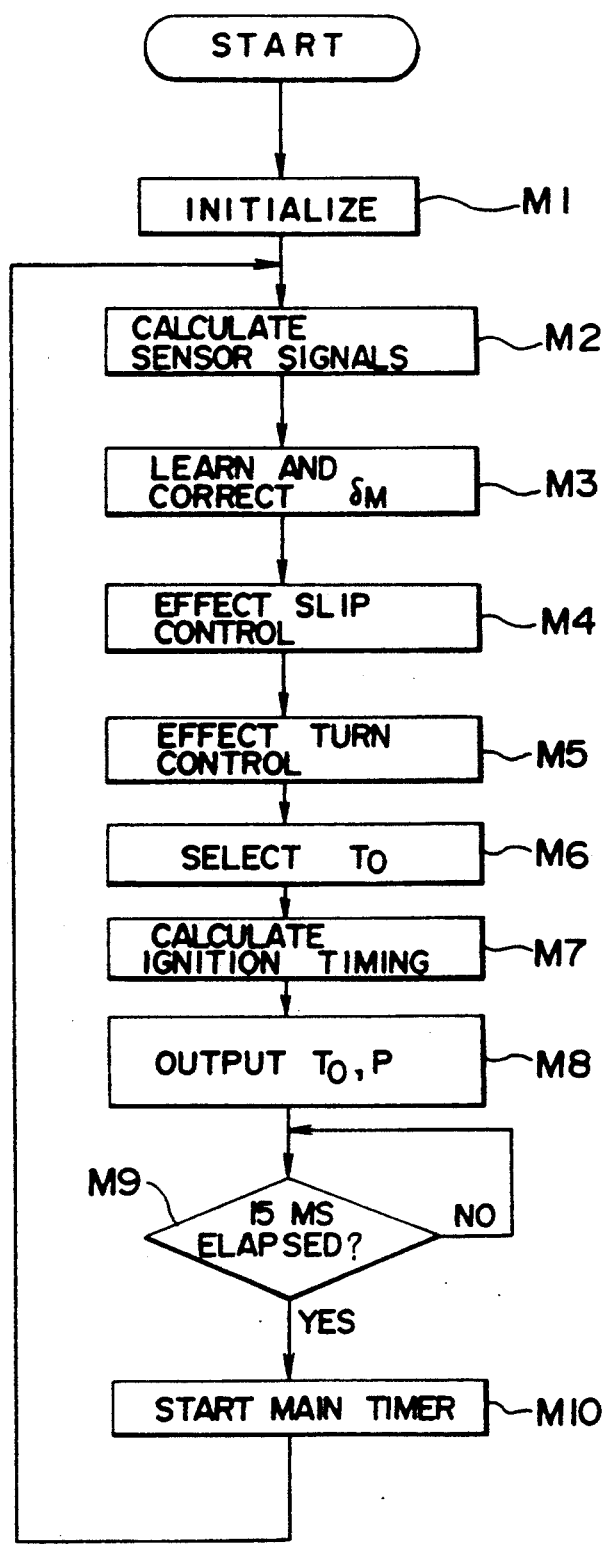
FIG. 4 is a flowchart of a control sequence of the motor vehicle output power control system.

Such a control sequence is roughly shown in FIG. 4. A control program for the control sequence shown in FIG. 4 is started when the ignition key switch is turned on. First, a neutral position $\delta_M$ of the steering shaft is read and various flags are reset or a main timer starts counting a sampling period of 15 milliseconds in a step M1.

Then, the TCL 75 calculates a vehicle speed V, an angle $\delta_H$ through which the steering shaft 82 is turned, and other values based on detected signals from the various sensors in a step M2, and the neutral position $\delta_M$ of the steering shaft 82 is learned and corrected in a step M3. The neutral position $\delta_M$ of the steering shaft 82 is not stored in memories (not shown) in the TCL 75 when the motor vehicle 81 starts to run for the first time. Therefore, only when the motor vehicle 82 starts running for the first time, the detected signal from the steering angle sensor 83, indicating the initial position $\delta_{m(o)}$ of the steering shaft 82, is read as the neutral position $\delta_M$.

The TCL 75 then calculates, in a step M4, a target drive torque $T_{OS}$ for the engine 11 in the slip control process in which the drive torque produced by the engine 11 is limited on the basis of a detected signal from the front wheel speed sensor 66 and detected signals from the rear wheel speed sensors 79, 80. The TCL 75 also calculates, in a step M5, a target drive torque $T_{OC}$ for the engine 11 in the turn control process in which the drive torque produced by the engine 11 is limited o the basis of detected signals from the rear wheel speed sensors 79, 80 and a detected signal from the steering angle sensor 83.

In a step M6, the TCL 75 selects a smaller one of the target drive torques $T_{OS}$, $T_{OC}$ as an optimum final target drive torque TO primarily in consideration of safety. When the motor vehicle 81 starts to run abruptly or the road condition changes from an ordinary dry surface to an ice-covered surface, the output torque of the engine 11 may not be lowered quickly enough even if the throttle valve 20 is fully closed through the actuator 41. To cope with such a situation, the TCL 75 selects a retard ratio for correcting a basic retard $p_B$ based on a ratio of change $G_s$ of an amount of slip s of the front wheels 64, 65 in a step M7, and then transmits data relative to the final target drive torque $T_O$ and the retard ratio for correcting the basic retard $p_B$ to the ECU 15 in a step M8.

When the driver positively selects the slip control process or the turn control process through a manual switch (not shown), the ECU 15 controls the duty ratio of the torque control solenoid-operated valves 51, 56 so that the drive torque of the engine 11 reaches the final target drive torque $T_O$. The ECU 15 also calculates a target retard $p_O$ based on the retard ratio, and delays the ignition timing P by the target retard $p_O$, thereby controlling the motor vehicle 82 to run safely.

When the driver does not positively select the slip control process or the turn control process, the ECU 15 sets the duty ratio of the torque control solenoid-operated valves 51, 56 to 0%. The motor vehicle 81 is now driven with the output torque of the engine 11 being controlled solely depending on the depression of the accelerator pedal 31.

The drive torque produced by the engine 11 is continuously controlled until the sampling period of 15 milliseconds is counted down by the main timer in a step M9. Then, the main timer starts counting the sampling period again in a step M10. Thereafter, the steps M2 through M10 are repeated until the ignition key switch is turned off.

In the step M5 to calculate the target drive torque $T_{OC}$ for the engine in the turn control process, the TCL 75 calculates a vehicle speed V according to the equation (1), given below, based on detected signals from the rear wheel speed sensors 79, 80, a steering angle $\delta$ of the front wheels 64, 65 according to the equation (2), given below, based on a detected signal from the steering angle sensor 83, and a demanded lateral acceleration $G_{YO}$ for the motor vehicle 81 according to the equation (3), given below.

$$V = \frac{V_{RL} + V_{RR}}{2} \quad (1)$$

$$\delta = \frac{\delta_H}{\rho H} \quad (2)$$

$$G_{YO} = \frac{\delta}{l \cdot \left(A + \frac{1}{V^2}\right)} \quad (3)$$

where $V_{RL}$, $V_{RR}$ are the peripheral speeds (hereinabove referred to as "rear wheel speeds") of the rear wheels 77, 78, $\rho H$ is the speed reduction ratio of the steering gears, $\delta_H$ is the angle through which the steering shaft 82 is turned, $\lambda$ the wheelbase of the motor vehicle 81, and A is the stability factor (described later on) of the motor vehicle 81.

As can be seen from the equation (3), if the neutral position $\delta_M$ of the steering shaft 82 varies due to adjustment of the toe-in of the front wheels 64, 65 when the motor vehicle 81 is serviced or due to aging such as wear on the steering gears (not shown), the angular position $\delta_m$ to which the steering shaft 82 is turned and the actual steering angle $\delta$ of the front wheels 64, 65 may differ from each other. As a result, the demanded lateral acceleration $G_{YO}$ for the motor vehicle 81 may not accurately be calculated, and hence the turn control process may not be carried out properly. Furthermore, since the demanded lateral acceleration $G_{YO}$ is used in the calculation of a corrective amount $G_{KC}$ for longitudinal acceleration and a corrective amount $V_{KC}$ for slip in the slip control process in the step M4, the slip control process may not be carried out properly either. In view of the above consideration, the neutral position $\delta_M$ of the steering shaft 82 should be learned and corrected in the step M3.

Figure 5:
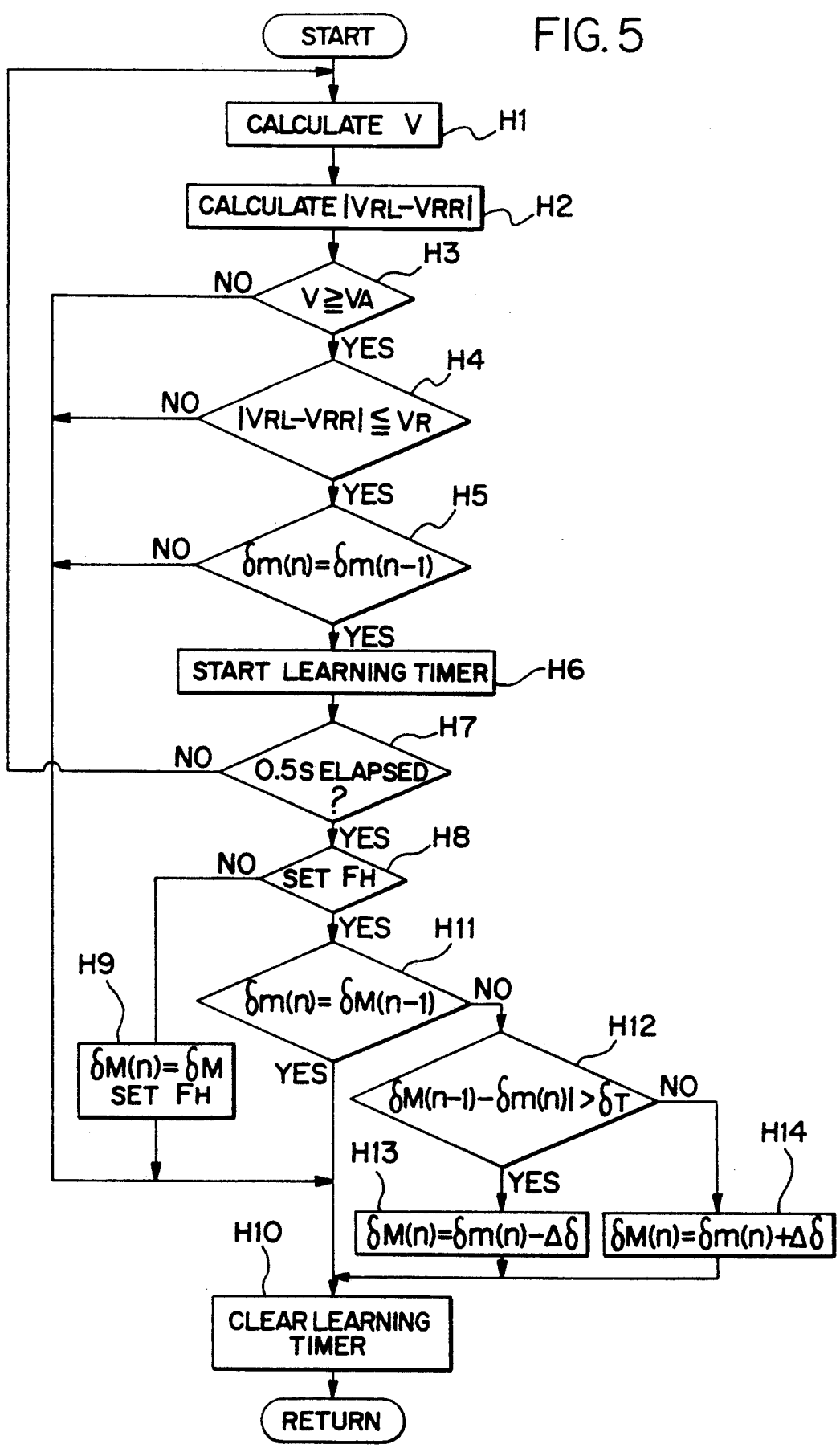
FIG. 5 is a flowchart of a process for learning and correcting a neutral, position of a steering shaft.

A process for learning and correcting the neutral position $\delta_M$ of the steering shaft 82 is shown in FIG. 5. First, the TCL 75 calculates a vehicle speed V according to the above equation (1) in a step H1 based on the detected learning of the neutral position $\delta_H$ and the subsequent turn control process.

Then, the TCL 76 calculates the difference $|V_{RL} - V_{RR}|$ (hereinafter referred to as a "rear wheel speed difference") between the rear wheel speeds $V_{RL}$, $V_{RR}$ in a step H2. Thereafter, the TCL 76 determines, in a step H3, whether or not the vehicle speed V is equal to or higher than a predetermined threshold value $V_A$ in a step H3. The decision step H3 is necessary because the rear wheel speed difference $|V_{RL} - V_{RR}|$ due to a steering action cannot be detected unless the motor vehicle 81 runs at a certain high speed. The threshold value $V_A$ may be experimentally set to 10 km/hour, for example, based on running characteristics of the motor vehicle 81.

If the vehicle speed V is equal to or higher than the threshold valve $V_A$ in the step H3, then the TCL 75 determines, in a step H4, whether or not the rear wheel speed difference $|V_{RL} - V_{RR}|$ is equal to or smaller than a predetermined threshold value $V_B$, e.g., 0.5 km/hour, i.e., whether the motor vehicle 81 runs straight or not. The threshold value $V_B$ is not set to 0 km/hour because if the air pressures in the tires of the rear wheels 77, 78 are not equal to each other, the peripheral speeds $V_{RL}$, $V_{RR}$ of the rear wheels 77, 78 differ from each other and the motor vehicle 81 may be determined not to run straight when the motor vehicle 81 actually runs straight.

If the rear wheel speed difference $|V_{RL} - V_{RR}|$ is equal to or smaller than the threshold value $V_B$ in the step H4, then the TCL 75 determines, in a step H5, whether a presently calculated steering shaft angular position $\delta_{m(n)}$ is equal to a previously calculated steering shaft angular position $\delta_{m(n-1)}$ or not. In order to avoid the influence of minor oscillatory angular movements of the steering wheel caused by the driver, the resolution of the steering angle sensor 83 to detect the angular movement of the steering shaft 82 should preferably be 5 degrees.

If the presently calculated steering shaft angular position $\delta_{m(n)}$ is equal to the previously calculated steering shaft angular position $\delta_{m(n-1)}$ in the step H5, then the TCL 75 determines that the motor vehicle 81 is presently running straight ahead, and causes a built-in learning timer (not shown) to start counting time for 0.5 second, for example, in a step H6.

Thereafter, the TCL 75 determines, in a step H7, whether 0.5 second has elapsed from the start of the counting of the learning timer, i.e., whether the motor vehicle 81 has been running straight continuously for 0.5 second or not. Since 0.5 second has not elapsed from the start of the counting of the learning timer when the motor vehicle 81 has started running, the steps H1 through H7 are repeated.

If 0.5 second has elapsed from the start of the counting of the learning timer, i.e., if the motor vehicle 81 has been running straight continuously for 0.5 second, in the step H7, then the TCL 75 determines in a step H8 whether a steering angle neutral position learned flag $F_H$ has been set or not, i.e., whether the present learning cycle is for the first time or not.

If the steering angle neutral position learned flag $F_H$ has not been set in the step H8, then the TCL 75 regards the present steering shaft angular position $\delta_{m(n)}$ as a new neutral position $\delta_M$ of the steering shaft 82, reads the neutral position $\delta_M$ into the memory in the TCL 75, and sets the steering angle neutral position learned flag $F_H$ in a step H9. A learned value $\delta_T$ at this time is produced by subtracting the present steering shaft angular position $\delta_{m(n)}$ from the neutral position $\delta_M$ of the steering shaft 82 in the initial condition in the step M1 (FIG. 4), i.e., is given by:

$$\delta_T = |\delta_M - \delta_{m(n)}|$$

After the new neutral position $\delta_M$ has been established, the TCL 75 calculates the angle $\delta_H$ through which the steering shaft 82 is turned from the neutral position $\delta_M$ thereof. The TCL 75 then clears the learning timer in a step H10, after which the steering angle neutral position is learned again.

If the steering angle neutral position learned flag $F_H$ is set in the step H8, i.e., if the neutral position is learned second time or subsequently, the TCL 75 determines, in a step H11, whether or not the presently calculated steering shaft angular position $\delta_{m(n)}$ is equal to the previously calculated steering shaft angular position $\delta_{M(n-1)}$, i.e., $$\delta_{m(n)} = \delta_{M(n-1)}.$$

If the presently calculated steering shaft angular position $\delta_{m(n)}$ is equal to the previously calculated steering shaft angular position $\delta_{M(n-1)}$ in the step H11, then control goes to the step H10, and a next steering neutral position is learned.

If the present steering shaft angular position $\delta_{m(n)}$ is not equal to the previous steering shaft angular position $\delta_{M(n-1)}$ due to a play of the steering system or the like in the step H11, then the TCL 75 determines in a step H12 whether the absolute value of the difference between the present and previous steering shaft angular positions is greater than the previous learned value $\delta_T$ or not. If the absolute value of the difference is larger than the previous learned value $\delta_T$ in the step H12, then the TCL 75 does not regard the present steering shaft angular position $\delta_{m(n)}$ as a new steering position $\delta_{M(n)}$. Instead, the TCL 75 uses a value, produced by subtracting a predetermined corrective amount $\Delta\delta$ of about 5 degrees corresponding to the detecting resolution of the steering shaft angle sensor 83 from the present steering shaft angular position $\delta_{m(n)}$, as a new neutral position $\delta_{M(n)}$ of the steering shaft 82, and then reads the new neutral position thus determined into the memory therein, in a step H13.

As a consequence, even when an abnormal detected signal is transmitted from the steering angle sensor 83 for some reason, the neutral position $\delta_{M(n)}$ of the steering shaft 82 does not abruptly change, but is allowed to converge quickly.

If the difference is smaller than the previous learned value $\delta_T$ in the step H12, then the TCL 75 does not regard the present steering shaft angular position $\delta_{m(n)}$ as a new neutral position $\delta_{M(n)}$. Instead, the TCL 75 uses a value, produced by adding the corrective amount $\Delta\delta$ to the present steering shaft angular position $\delta_{m(n)}$, as a new neutral position $\delta_{M(n)}$ of the steering shaft 82, and then reads the new neutral position thus determined into the memory therein, in a step H14.

As a consequence, even when an abnormal detected signal is transmitted from the steering angle sensor 83 for some reason, the neutral position $\delta_{M(n)}$ of the steering shaft 82 does not abruptly change, but any changes therein are reduced.

Figure 26:
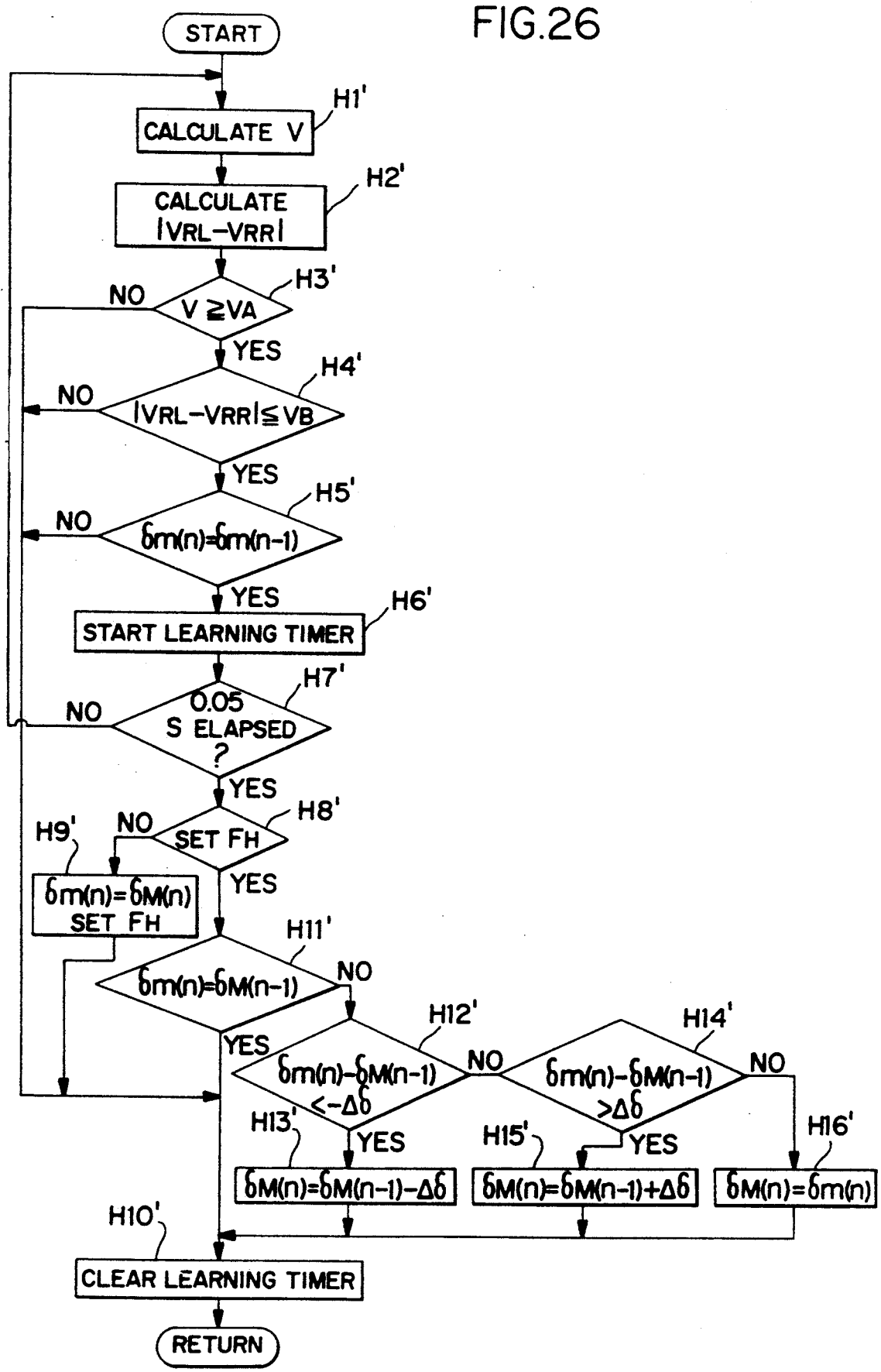
FIG. 26 is a flowchart of a process for learning and correcting a neutral position of a steering shaft according to another embodiment of the present invention.

A routine for learning the neutral position of the steering shaft as shown in FIG. 26 may be employed instead of the above routine for learning the neutral position of the steering shaft.

The routine shown in FIG. 26 includes steps H1' through H11', which are essentially the same as the steps H1 through H11 shown in FIG. 5, and hence these steps H1' through H11' will not be described below.

It is assumed that the steering angle neutral position is learned twice or more, and control has reached the step H11'.

If the present steering shaft angular position $\delta_{m(n)}$ is not equal to the previous steering shaft angular position $\delta_{M(n-1)}$ due to a play of the steering system or the like in the step H11', then the TCL 75 does not regard the present steering shaft angular position $\delta_{m(n)}$ as a new steering position $\delta_{M(n)}$ of the steering shaft 82. If the absolute value of the difference is greater by a predetermined corrective limit amount $\Delta\delta$, then, the TCL 75 regards a value, produced by subtracting or adding the corrective limit amount $\Delta\delta$ from or to the previous neutral position $\delta_{M(n-1)}$, as a new neutral position $\delta_{M(n)}$ of the steering shaft 82, and then reads the new neutral position thus determined into the memory therein.

More specifically, the TCL 75 determines, in a step H12', whether the difference produced by subtracting the previous steering shaft angular position $\delta_{M(n-1)}$ from the present steering shaft angular position $\delta_{m(n)}$ is smaller than a predetermined negative corrective limit amount $-\Delta\delta$ or not. If the difference is smaller than the negative corrective limit amount $-\Delta\delta$ in the step H12', then the new steering shaft neutral position $\delta_{M(n)}$ is changed to:

$$\delta_{M(n)} = \delta_{M(n-1)} - \Delta\delta$$

using the previous steering shaft angular position $\delta_{M(n-1)}$ and the negative corrective limit amount $-\Delta\delta$ in a step H13', so that the learned and corrected amount in one cycle will not be negatively increased unconditionally.

As a consequence, even when an abnormal detected signal is transmitted from the steering angle sensor 83 for some reason, the neutral position $\delta_M$ of the steering shaft 82 does not abruptly change, and the malfunction of the steering angle sensor 83 may quickly be coped with.

If the difference is larger than the negative corrective limit amount $-\Delta\delta$ in the step H12', then the TCL 75 determines, in a step H14', whether the difference produced by subtracting the previous steering shaft angular position $\delta_{M(n-1)}$ from the present steering shaft angular position $\delta_{m(n)}$ is larger than a predetermined positive corrective limit amount $\Delta\delta$ or not. If the difference is larger than the positive corrective limit amount $\Delta\delta$ in the step H14', then the new steering shaft neutral position $\delta_{M(n)}$ is changed to:

$$\delta_{M(n)} = \delta_{M(n-1)} + \Delta\delta$$

using the previous steering shaft angular position $\delta_{M(n-1)}$ and the positive corrective limit amount $\Delta\delta$ in a step H15', so that the learned and corrected amount in one cycle will not be positively increased unconditionally.

As a consequence, even when an abnormal detected signal is transmitted from the steering angle sensor 83 for some reason, the neutral position $\delta_M$ of the steering shaft 82 does not abruptly change, and the malfunction of the steering angle sensor 83 may quickly be coped with.

If the difference is smaller than the positive corrective limit amount $\Delta\delta$ in the step H14', then the present steering shaft angular position $\delta_{m(n)}$ is read as the new steering shaft neutral position $\delta_{M(n)}$ in a step H16'.

Figure 6:
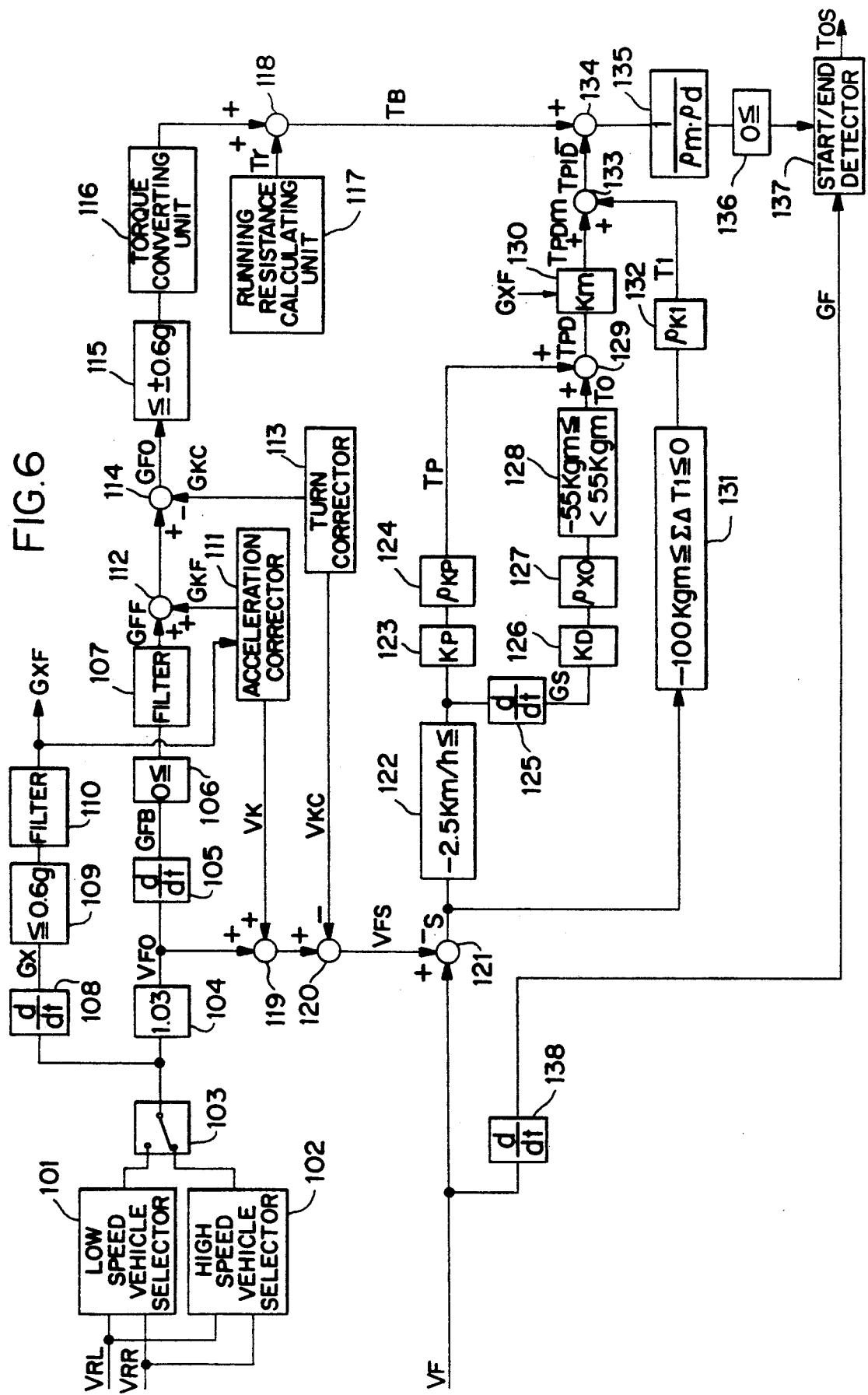
FIG. 6 is a block diagram illustrating a procedure for calculating a target drive torque to be used in a slip control process.

After the neutral position $\delta_M$ of the steering shaft 82 is learned and corrected according to the control program for leaning the steering angle neutral position as shown in FIG. 5 or 6, the target drive torque $T_{OS}$ is calculated for the slip control process for limiting the drive torque produced by the engine 11, based on the detected signal from the front wheel speed sensor 66 and the detected signals from the rear wheel speed sensors 79, 80.

In this embodiment, a target peripheral speed (hereinafter referred to as a "reference torque calculating target front wheel speed") $V_{FO}$ of the front wheels 64, 65 is calculated on the basis of the detected signals from the rear wheel speed sensors 79, 80, and a rate of change (hereinafter referred to as a "target longitudinal acceleration) $G_{FO}$ of the reference torque calculating target front wheel speed $V_{FO}$ is determined. Furthermore, a reference drive torque $T_B$ of the engine 11 which corresponds to the magnitude of the target longitudinal acceleration $G_{FO}$ is corrected on the basis of the difference (hereinafter referred to as a "slip") s between an actual front wheel speed $V_F$ detected by the front wheel speed sensor $V_F$ and the reference torque calculating target front wheel speed $V_{FO}$, thereby producing the target drive torque $T_{OS}$.

FIG. 6 shows in block form a procedure for calculating the target drive torque $T_{OS}$. The TCL 75 first calculates a vehicle speed V based on the detected signals from the rear wheel speed sensors 79, 80. More specifically, a smaller one of the two rear wheel speeds $V_{RL}$, $V_{RR}$ is selected as a vehicle speed V with a lower vehicle speed selector 101, and a larger one of the two rear wheel speeds $V_{RL}$, $V_{RR}$ is selected as a vehicle speed V with a higher vehicle speed selector 102. Then, one of output signals from the two vehicle speed selectors 101, 102 is selected by a switch 103.

More specifically, while the drive torque produced by the engine 11 is being lowered in the slip control process for the rear wheels, i.e., a slip control flag $F_S$ is being set, a smaller one of the rear wheel speeds $V_{RL}$, $V_{RR}$ is selected as the vehicle speed V by the switch 103. While the drive torque produced by the engine 11 is not being lowered even if the driver wants to effect the slip control process, i.e., if the slip control flag $F_S$ is being reset, a larger one of the rear wheel speeds $V_{RL}$, $V_{RR}$ is selected by the switch 103.

The above selection of the vehicle speed is carried out in order to make it difficult to switch from a condition in which the drive torque of the engine 11 is not lowered to a condition in which the drive torque of the engine 11 is lowered, and also make it difficult to switch from the latter condition to the former condition. For example, if a smaller one of the two rear wheel speeds $V_{RL}$, $V_{RR}$ is selected as the vehicle speed V while the motor vehicle 81 is turning, then it may be determined that a slip is produced and the drive torque of the engine 11 is lowered even though the front wheels 64, 65 are not subjected to any slip. Such an undesired condition can be avoided by the above vehicle speed selection process. Furthermore, the above vehicle speed selection is effective to continue a condition in which the drive torque of the engine 11 is once lowered in view of safety of the motor vehicle 81 while it is running.

Then, a reference longitudinal acceleration $G_{FB}$ is calculated on the basis of the vehicle speed V. Since the front wheels 64, 65 are normally subjected to a slip of about 3% with respect to the road surface at all times while the motor vehicle 81 is running, the target front wheel speed $V_{FO}$ is calculated in view of the slip by a multiplier 104 according to the following equation (4):

$$V_{FO} = 1.03 \cdot V \quad (4).$$

The reference longitudinal acceleration $G_{FB(n)}$ in the nth sampling time is calculated with a differentiator 105 according to the equation (6):

$$G_{FB(n)} = \frac{V_{FO(n)} - V_{FO(n-1)}}{3 \cdot 6 \cdot \Delta t \cdot g} \quad (5)$$

where $\Delta t$ is the sampling period of 15 milliseconds, of the main timer, and g is the gravitational acceleration.

Because the slip control process is carried out when the motor vehicle 81 is accelerated in principle, the numerals in any decimal places of the reference longitudinal acceleration $G_{FB}$ calculated according to the equation (5) are omitted by a clipper 106, and the reference longitudinal acceleration $G_{FB}$ is filtered to remove noise through a filter unit 107, thus providing a corrected reference longitudinal acceleration $G_{FF}$.

In order to have the drive torque generated by the engine 11 effectively work when the motor vehicle 81 is accelerated, it is desirable that the slip ratio S of the tires of the front wheels 64, 65 as they are running be adjusted to be equal to the target slip ratio $S_O$ corresponding to the maximum value of the coefficient of friction between the tires and the road surface or to a value smaller than and close to the target slip ratio $S_O$, thereby avoiding any energy loss and maintaining maneuverability and accelerating capability of the motor vehicle 81.

It is known that the target slip ratio $S_O$ is variable in the range of from 0.1 to 0.25 depending on the condition of the road surface on which the motor vehicle 81 runs. Since the coefficient of friction between the tires and the road surface can be regarded as being equivalent to the longitudinal acceleration $G_X$ of the motor vehicle 81, the longitudinal acceleration $G_X$ on the motor vehicle 81 may be detected, and the corrected reference longitudinal acceleration $G_{FF}$ may be corrected on the basis of the longitudinal acceleration $G_X$.

A present longitudinal acceleration $G_{X(n)}$ of the motor vehicle 81 is calculated according to the equation (6), given below, by a differentiator 108, based on a vehicle speed $V_{(n)}$ which is presently calculated and a vehicle speed $V_{(n-1)}$ which has been calculated in a preceding cycle.

$$G_{X(n)} = \frac{V_{(n)} - V_{(n-1)}}{3 \cdot 6 \cdot \Delta t \cdot g} \quad (6)$$

If the calculated longitudinal acceleration $G_{X(n)}$ is 0.6 g or greater, then it the longitudinal acceleration $G_{x(n)}$ is clipped to 0.6 g by a clipper 109 so that the maximum value of the longitudinal acceleration $G_{X(n)}$ does not exceed 0.6 g to provide for safety against calculation errors. Furthermore, the longitudinal acceleration $G_{X(n)}$ is filtered to remove noise through a filter unit 110, thus providing a corrected longitudinal acceleration $G_{XF}$.

The longitudinal acceleration $G_{X(n)}$ of the motor vehicle 81 may be regarded as being equivalent to the coefficient of friction between the tires and the road surface. Even when the maximum value of the longitudinal acceleration $G_{X(n)}$ varies to the extent that the slip ratio S of the tires deviates from a target slip ratio $S_O$ corresponding to the maximum value of the coefficient of friction between the tires and the road surface or a value in the vicinity of the target slip ratio $S_O$, the longitudinal acceleration $G_{X(n)}$ is corrected by the filtering process in the filter unit 110 so that the slip ratio S of the tires will be maintained as the target slip ratio $S_O$ corresponding to the maximum value of the coefficient of friction between the tires and the road surface or as a value smaller than and in the vicinity of the target slip ratio $S_O$. More specifically, the longitudinal acceleration $G_{X(n)}$ is filtered as follows:

If the present longitudinal acceleration $G_{X(n)}$ is equal to or higher than the previous filtered or corrected longitudinal acceleration $G_{XF}$, i.e., if the motor vehicle 81 is continuously accelerated, then the corrected longitudinal acceleration $G_{XF}$ is calculated according to the equation:

$$G_{XF} = \frac{28}{256} \cdot \Sigma(G_{X(n)} - G_{XF})$$

thus removing noise through a delay process, so that the corrected longitudinal acceleration $G_{XF}$ will converge to the longitudinal acceleration $G_{X(n)}$ relatively soon.

If the longitudinal acceleration $G_{X(n)}$ is smaller than the corrected longitudinal acceleration $G_{XF}$, i.e., if the motor vehicle 81 is not accelerated substantially, then the following process is carried out at each sampling time $\Delta t$ counted by the main timer.

If the slip control flag $F_S$ is not set, i.e., if the drive torque produced by the engine 11 is not lowered by the slip control process, then since the motor vehicle 81 is being decelerated, and the corrected longitudinal acceleration $G_{XF}$ is calculated as:

$$G_{XF} = G_{XF} - 0.002$$

so that it is prevented from being lowered. The response to the demand of the driver for acceleration of the motor vehicle 81 is thereby maintained.

Even when the slip s is positive, i.e., the front wheels 64, 65 are subjected to a slip while the drive torque of the engine 11 is being lowered by the slip control process, since any acceleration of the motor vehicle 81 is low, no safety problem arises, and the corrected longitudinal acceleration $G_{XF}$ is calculated as:

$$G_{XF} = G_{XF} - 0.002$$

so that it is prevented from being lowered. The response to the demand of the driver for acceleration of the motor vehicle 81 is thereby maintained.

When the slip s is negative, i.e., the motor vehicle 81 is being decelerated while the drive torque of the engine 11 is being lowered by the slip control process, the maximum value of the corrected longitudinal acceleration $G_{XF}$ is kept, thereby maintaining the response to the demand of the driver for acceleration of the motor vehicle 81.

Figure 8:
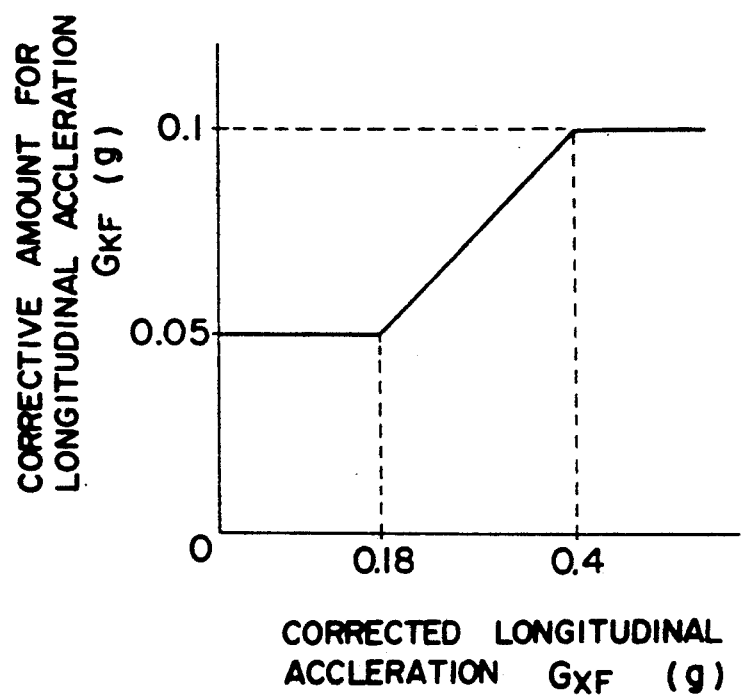
FIG. 8 is a graph showing a map which indicates the relationship between a corrected longitudinal acceleration and a corrective amount for longitudinal acceleration.

Based on the corrected longitudinal acceleration $G_{XF}$ thus determined, a corresponding corrective amount $G_{KF}$ for longitudinal acceleration is read from a map shown in FIG. 8 by an acceleration corrector 111. The corrective amount $G_{KF}$ for longitudinal acceleration is then added to a corrected reference longitudinal acceleration $G_{FF}$ by an adder 112. The corrective amount $G_{KF}$ for longitudinal acceleration is of such a tendency that it gradually increases as the corrected longitudinal acceleration $G_{XF}$ increases, as shown in the map of FIG. 8. The map of FIG. 8 is generated according to running tests or the like.

Figure 7:
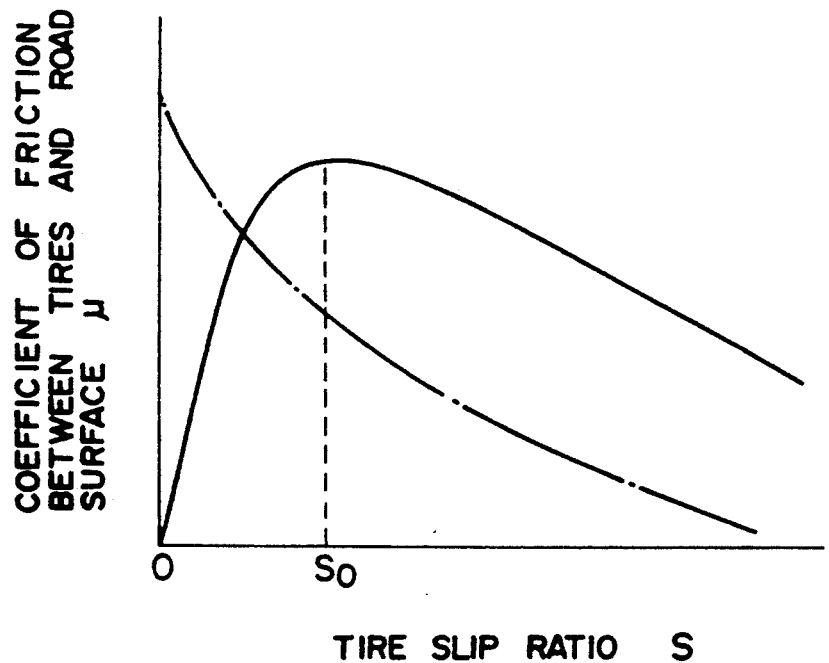
FIG. 7 is a graph showing a map which indicates the relationship between a coefficient of friction between a tire and a road surface and a slip rate of the tire.

The dot-and-dash-line curve in FIG. 7 represents the relationship between the coefficient of friction between the tires and the road surface while the motor vehicle is turning and the slip ratio S of the tires. As indicated by this curve in FIG. 7, the slip ratio of the tires, which is the maximum value of the coefficient of friction between the tires and the road surface during the turn, is considerably smaller than the target slip ratio $S_O$ for the tires, which is the maximum value of the coefficient of friction between the tires and the road surface while the motor vehicle 81 is running straight. Therefore, in order to allow the motor vehicle 81 to make a smooth turn, it is desirable that the corrected reference longitudinal acceleration $G_{FF}$ during the turn be smaller than that during a straight travel.

Figure 9:
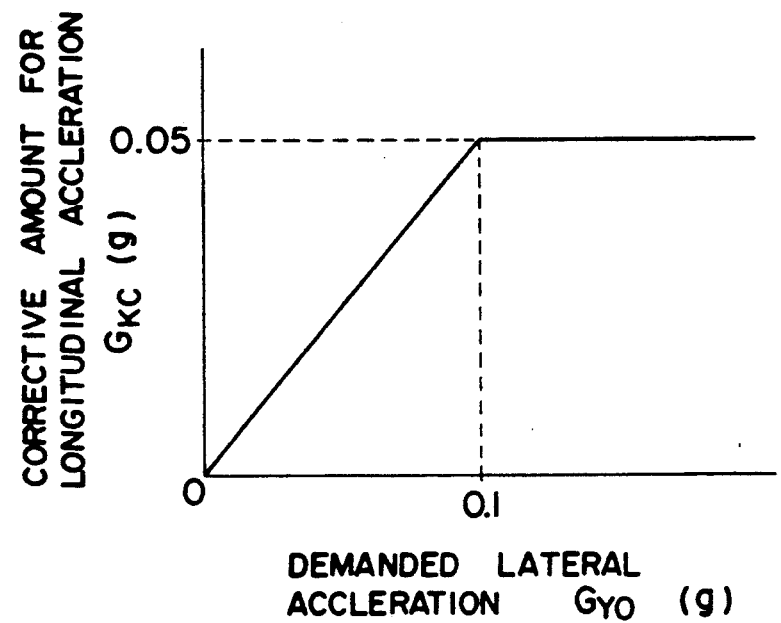
FIG. 9 is a graph showing a map which indicates the relationship between a demanded lateral acceleration and a corrective amount for longitudinal acceleration.

Based on the demanded lateral acceleration $G_{YO}$ amount $G_{KC}$ for longitudinal acceleration is read from a map shown in FIG. 9 by a turn corrector 113. The corrective amount $G_{KC}$ for longitudinal acceleration is subtracted from the corrected reference longitudinal acceleration $G_{FF}$ by a subtractor 114, thus providing a target longitudinal acceleration $G_{FO}$ as follows:

$$G_{FO} = G_{FF} + G_{KF} - G_{KC}$$

If the target longitudinal acceleration $G_{FO}$ is less than $-0.6$ g or greater than 0.6 g, then it is clipped to the range of from $-0.6$ g to 0.6 g by a clipper 115 for safety against calculation errors. Thereafter, the clipped target longitudinal acceleration $G_{FO}$ is converted into a torque value by a torque converting unit 116, after which a running resistance $T_R$ calculated by a running resistance calculating unit 117 is added to the torque value by an adder 118, thereby providing a reference drive torque $T_B$ as follows:

$$T_B = G_{FO} \cdot W_b \cdot r + T_R$$

where $W_b$ is the weight of the motor vehicle and r is the effective radius of the front wheels 64, 65.

The reference drive torque $T_B$ is determined in this manner on the basis of the target longitudinal acceleration $G_{FO}$. As described above, the target longitudinal acceleration $G_{FO}$ is produced by correcting the corrected reference longitudinal acceleration $G_{FF}$ with the corrected longitudinal acceleration $G_{XF}$ and the demanded lateral acceleration $G_{YO}$.

Therefore, as the corrected longitudinal acceleration $G_{XF}$ is greater, the reference drive torque $T_B$ is corrected into a grater value, and as the demanded lateral acceleration $G_{YO}$ is greater, the reference drive torque $T_B$ is corrected into a smaller value.

As the corrected longitudinal acceleration $G_{XF}$ is greater, the acceleration of the motor vehicle 81 is increased and the coefficient of friction of the road surface is relatively large. In such a case, the reference drive torque $T_B$ is set to a relatively large value for increased ability of the motor vehicle 81 to accelerate.

As the demanded lateral acceleration $G_{YO}$ is greater, the motor vehicle 81 is making a sharper turn or a turn having a smaller radius of curvature. During the turn, the reference drive torque $T_B$ is selected to be smaller than during a straight run, thus limiting any slip of the drive wheels to a smaller amount. Lateral forces on the motor vehicle 81 are then increased for increased ability of the motor vehicle 81 to turn.

Figure 10:
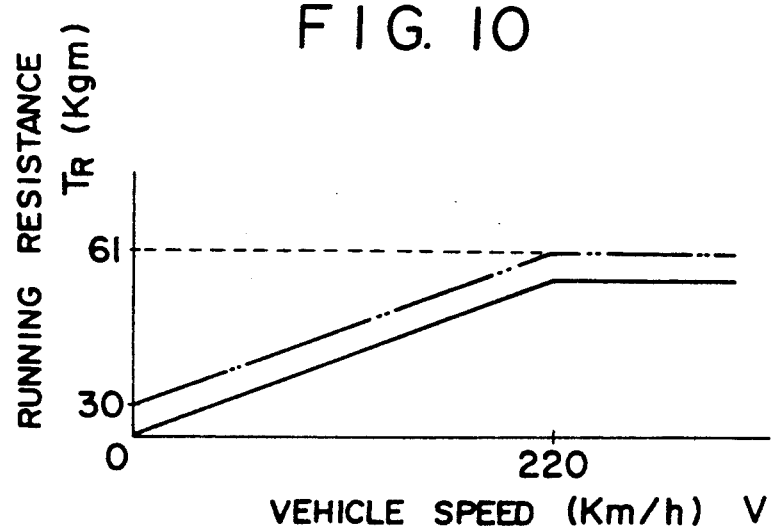
FIG. 10 is a graph showing a map which indicates the relationship between a vehicle speed and a running resistance.

The running resistance $T_R$, which is used in the calculation of the reference drive torque $T_B$, may be calculated as a function of the vehicle speed V, but is determined from a map shown in FIG. 10 in the illustrated embodiment. Since the running resistance $T_R$ has different values on flat and uphill roads, the map shown in FIG. 10 includes two curves, one curve represented by the solid line for flat roads and one curve represented by the two-dot-and-dash line for uphill roads, and one of the two curves is selected based on a detected signal from an inclination sensor (not shown) on the motor vehicle 81. However, more values of the running resistance $T_R$ including those for a downhill road may also be established.

The TCL 75 calculates the actual front wheel speed $V_F$ based on the detected signal from the front wheel speed sensor 66, and also calculates the target drive torque $T_{OS}$ for the engine 11 through feedback control of the reference drive torque $T_B$, using the slip s which is the difference between the front wheel speed $V_F$ and a corrected torque calculating target front wheel speed $V_{FS}$ that is established on the basis of a target front wheel speed $V_{FO}$.

More specifically, to calculate the target longitudinal acceleration $G_{FO}$, the corrected reference longitudinal acceleration $G_{FF}$ is corrected by the acceleration corrector 111 and the turn corrector 113. The reference torque calculating target front wheel speed $V_{FO}$ is also corrected similarly to calculate the corrected torque calculating target front wheel speed $V_{FS}$.

Figure 11:
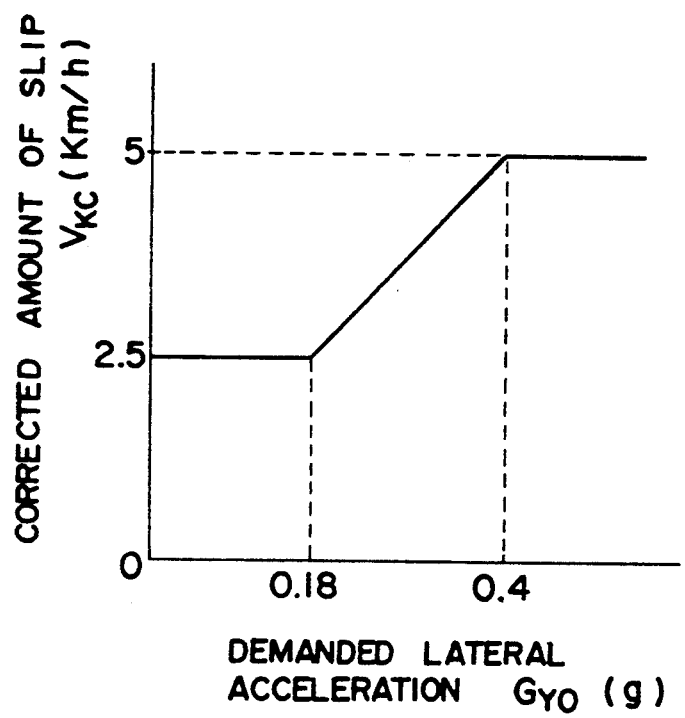
FIG. 11 is a graph showing a map which indicates the relationship between a corrected longitudinal acceleration and a corrective amount for slip upon acceleration.

The TCL 75 reads a corrective amount $V_K$ for slip corresponding to the corrected longitudinal acceleration $G_{XF}$ from a map shown in FIG. 11 in the acceleration corrector 111, and adds the corrective amount $V_K$ for slip to the reference torque calculating target front wheel speed $V_{FO}$ in an adder 119. Thus, the corrected torque calculating target front wheel speed $V_{FS}$ is increased, and the slip ratio S upon acceleration is selected to be equal to the target slip ratio $S_O$ indicated by the solid line in FIG. 7 or a value smaller than and close to the target slip ratio $S_O$.

Figure 12:
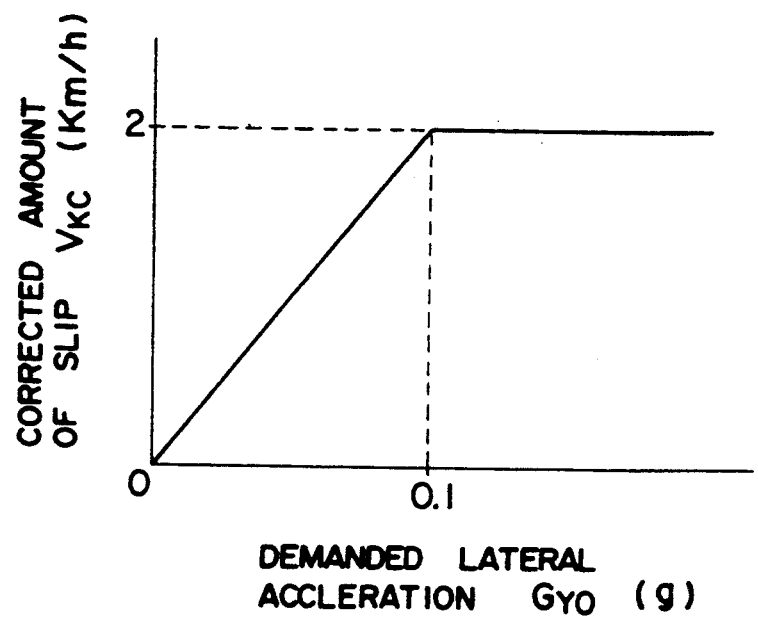
FIG. 12 is a graph showing a map which indicates the relationship between a demanded lateral acceleration and a corrective amount for slip upon turning.

Likewise, a corrective amount $V_{KC}$ for slip corresponding to the demanded lateral acceleration $G_{YO}$ is read from a map shown in FIG. 12 by the turn corrector 113, and then subtracted from the reference torque calculating target front wheel speed $V_{FO}$ by a subtractor 120. Thus, the corrected torque calculating target front wheel speed $V_{FS}$ is reduced for making the slip ratio S smaller during a turn than the target slip ratio $S_O$ during a straight run. While the acceleration performance of the motor vehicle 81 is slightly lowered, the motor vehicle 81 is able to turn well.

Until the first neutral position $\delta_M$ of the steering shaft 82 is learned after the ignition key switch is turned on, the angle $\delta_H$ of the steering shaft 82 is not reliable, and hence the corrective amount $G_{KC}$ for longitudinal acceleration and the corrective amount $V_{KC}$ for slip are multiplied by 0. After the steering angle neutral position learned flag $F_H$ has been set, the corrective amount $G_{KC}$ for longitudinal acceleration and the corrective amount $V_{KC}$ for slip are multiplied by 1.

As a result, the corrected torque calculating target front wheel speed $V_{FS}$ is given by the following equation:

$$V_{FS} = V_{FO} + V_K - V_{KC}.$$

Thereafter, a slip s which is the difference between the actual front wheel speed $V_F$ that is produced by filtering the detected signal from the front wheel speed sensor 66 for noise removal and the corrected torque calculating target front wheel speed $V_{FS}$, is calculated by a subtractor 121. If the calculated slip s is equal to or smaller than a predetermined negative value, e.g., $-2.5$ km/hour, then the slip s is clipped to $-2.5$ km/hour by a clipper 122, so that the engine 11 is prevented from racing due to calculation errors. Then, the clipped sip s is subjected to proportional and differential correction processes (described later on), and is further subjected to an integral correction process using an integral constant $\Delta T_i$ (described later on), thereby calculating a final corrected torque $T_{PID}$.

In the proportional correction process, the slip s is multiplied by a proportional coefficient $K_P$ to determine a basic corrected amount in a multiplier 123, and the basic corrected amount is multiplied by a corrective coefficient $\rho_{KP}$ which has been preset according to the speed reduction ratio $\rho_m$ of the hydraulic automatic transmission 13 in a multiplier 124, thus providing a proportionally corrected torque $T_P$.

In the differential correction process, the rate of change $G_s$ of the slip s is calculated in a differentiator 125, and multiplied by a differential coefficient $K_O$ in a multiplier 126 for producing a basic corrective amount with respect to an abrupt change in the slip s. The basic corrective amount is then multiplied by a corrective coefficient $\rho_{KD}$ based on the speed reduction ratio pm of the hydraulic automatic transmission 13 in a multiplier 127. The multiplied basic corrective amount is clipped by a clipper 128 which gives upper and lower limits thereto, so that a differentially corrected torque $T_D$ will not have an excessively large value. While the motor vehicle 81 is running, the front and rear wheels may instantaneously spin or be locked depending on the road condition or running condition of the motor vehicle 81. When this happens, the rate of change $G_s$ of the slip s may be of an extremely large positive or negative value, causing the control process divergent for a lower response. In view of this, the clipper 128 clips the rate of change $G_s$ to the lower limit of $-55$ kgm and the upper limit of 55 kgm, for example, so that the differentially corrected torque $T_D$ will not be of an excessively large value.

Figure 13:
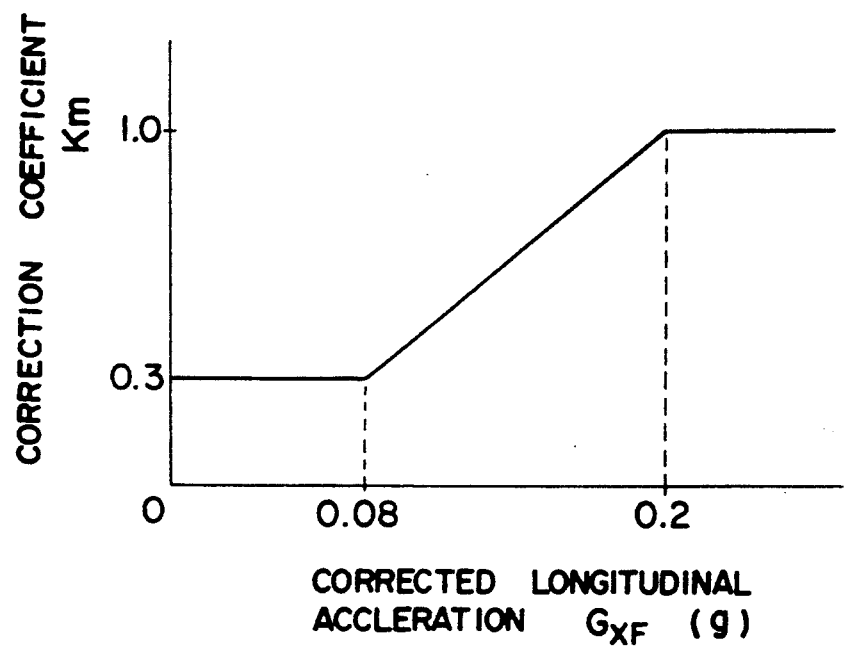
FIG. 13 is a graph showing a map which indicates the relationship between a corrected longitudinal acceleration and a road condition corrective coefficient.

Thereafter, the proportionally corrected torque $T_P$ and the differentially corrected torque $T_D$ are added to each other by an adder 129, thus producing a reference proportionally differentially corrected torque $T_{PD}$. In order to change the extent to which the reference proportionally differentially corrected torque $T_{PD}$ is corrected depending on the coefficient of friction between the tires and the road surface, a corrective coefficient $K_m$ for slip which corresponds to the corrected longitudinal acceleration $G_{XF}$ is read from a map shown in FIG. 13, and the reference proportionally and differentially corrected torque $T_{PD}$ is multiplied by the corrective coefficient $K_m$ for slip by a multiplier 130, thus producing a final proportionally and differentially corrected torque $T_{PDm}$. The corrective coefficient $K_m$ for slip is of such a tendency that it has a smaller value as the corrected longitudinal acceleration $G_{XF}$ has a smaller value, so that the extent of the correction for the final proportionally and differentially corrected torque $T_{PDm}$ is prevented from being reduced for excessive control when the motor vehicle 81 runs on a slippery road such as an ice-covered road.

In order to achieve a correction corresponding to a gradual change in the slip s, a basic corrective amount is calculated in an integral calculating unit 131, and the basic corrective amount is multiplied by a corrective coefficient $\rho_{KI}$ which has been preset according to the speed reduction ratio $\rho_m$ of the hydraulic automatic transmission 13 in a multiplier 132, thus providing an integrally corrected torque $T_I$. In the illustrated embodiment, a constant minute integrally corrected torque $\Delta T_I$ is integrated for increased control convergence. If the slip s is positive in each sampling period of 15 milliseconds, then the minute integrally corrected torque $\Delta T_I$ is added. If the slip s is negative, then the minute integrally corrected torque $\Delta T_I$ is subtracted. Since the ability of the motor vehicle 81 to accelerate is better if the time in which the actual front wheel speed $V_F$ is higher than the target front wheel speed $V_{FS}$ is longer, the integrally corrected torque $T_I$ is clipped to an upper limit of 0 kgm, for example. To avoid calculation errors, the integrally corrected torque $T_I$ is also clipped to a lower limit of $-100$ kgm, for example. The integrally corrected torque $T_I$ thus clipped varies with time s shown in FIG. 14.

Figures 14, 15:
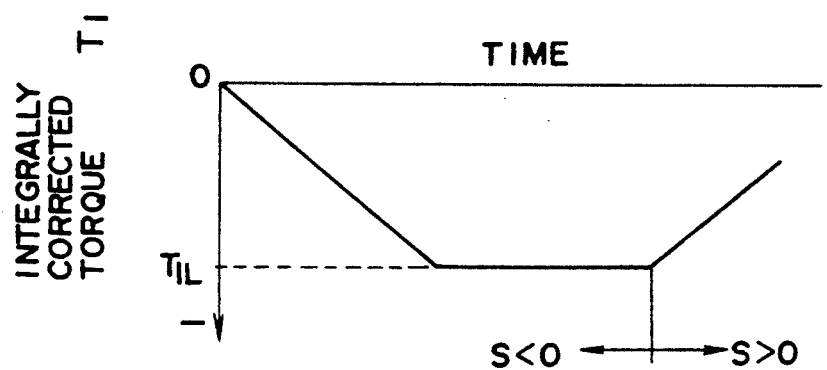
FIG. 14 is a graph showing regions where the integral corrected torque is increased and reduced.
FIG. 15 is a diagram showing a map which indicates the relationship between gear positions of the hydraulic automatic transmission and corrective coefficients corresponding to respective corrected torques.

The corrective coefficients $\rho_{KP}$, $\rho_{KI}$ are read from a map shown in FIG. 15 which is preset in relation to the speed reduction ratio $\rho_m$ of the hydraulic automatic transmission 13.

Thereafter, the final proportionally and differentially corrected torque $T_{PDm}$ and the integrally corrected torque $T_I$ are added to each other by an adder 133, thus producing a final corrected torque $T_{PID}$. The final corrected torque $T_{PID}$ is then subtracted from the reference drive torque $T_B$ by a subtractor 134. The difference is then multiplied in a multiplier 135 by the reciprocal of a total speed reduction ratio between the engine 11 and respective axles 85, 86 of the front wheels 64, 65, thus producing a target drive torque $T_{OS}$ for the slip control process, as expressed by the following equation (7):

$$T_{OS} = \frac{T_B - T_{PID}}{\rho_m \cdot \rho_d} \quad (7)$$

where $\rho_d$ is the speed, reduction ratio of the differential. In case the where the hydraulic automatic transmission 13 is shifted up, a speed reduction ratio $\rho_m$ for a higher gear position is produced after the upshift is finished. More specifically, in the case where the hydraulic automatic transmission 13 is shifted up, if a speed reduction ratio $\rho_m$ for a higher gear position were produced at the time a gearshift signal is issued, then the target drive torque $T_{OS}$ would be increased causing the engine 11 to race, as can be seen from the equation (7). To avoid this drawback, during a period of time after a gearshift signal is issued and until the gearshift is completed, e.g., for 1.5 seconds, a speed reduction ratio $\rho_m$ for a lower gear position, which allows the target drive torque $T_{OS}$ to be smaller, is maintained, and after the elapse of 1.5 seconds from the gearshift signal, a speed reduction ratio $\rho_m$ for a higher gear position is employed. For the same reason, in the case where the hydraulic automatic transmission 13 is shifted down, a speed reduction ratio $\rho_m$ for a lower gear position is employed immediately when a gearshift signal is issued.

Since the target drive torque $T_{OS}$ calculated according to the equation (7) above is naturally positive, the target drive torque $T_{OS}$ is clipped to a value equal to or greater than 0 by a clipper 136 in order to prevent calculation errors. Thereafter, information relative to the target drive torque $T_{OS}$ is issued to the ECU 15 by a start/end detector 137 which determines the start or end of the slip control process.

When all conditions (a) through (e) given below are satisfied, the start/end detector 137 determines that the slip control process is started, and sets the slip control flag $F_S$. The start/end detector 137 also operates the switch 103 to select a lower one of the rear wheel speeds $V_{RL}$, $V_{RR}$ as a vehicle speed V, and transmits the information relative to the target drive torque $T_{OS}$ to the ECU 15. The start/end detector 137 continues the above operation until it detects the end of the slip control process and resets the slip control flag $F_S$.

(a) The driver of the motor vehicle 81 operates on a manual switch (not shown) for the slip control process.

(b) The drive torque $T_d$ demanded by the driver is at least a minimum drive torque, e.g., 4 kgm, required to cause the motor vehicle 81 to run.

Figure 16:
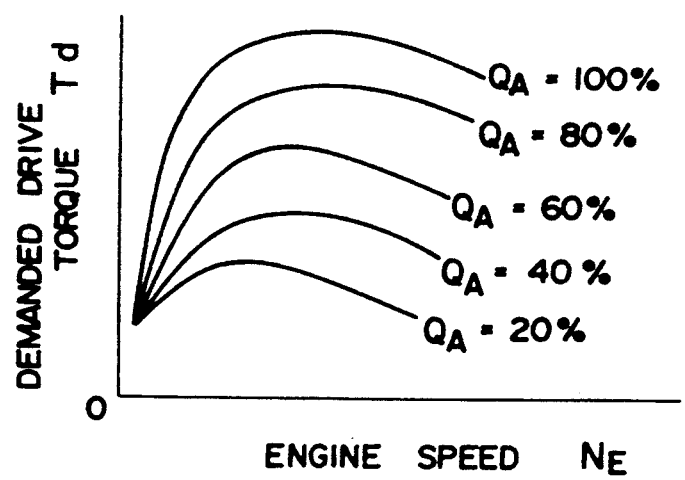
FIG. 16 is a graph showing a map which indicates an engine rotational speed, a demanded drive torque, and accelerator openings.

In the illustrated embodiment, the demanded drive torque $T_d$ is read from a map shown in FIG. 16 based on an engine speed $N_E$ calculated from the detected signal from the crankshaft angle sensor 62 and an accelerator opening $\theta_A$ calculated from the detected signal from the accelerator opening sensor 76.

(c) The slip s is 2 km/hour or more.

(d) The rate of change $G_s$ of the slip s is 0.2 g or more.

(e) The actual front wheel acceleration $G_F$, which has been produced by differentiating the actual front wheel speed $V_F$ with respect to time by a differentiator 138, is 0.2 g or more.

If any one of conditions (f), (g), described below, is satisfied after the start of the slip control process is detected by the start/end detector 137, then the start/end detector 137 determines that the slip control process comes to an end, and resets the slip control flag $F_S$. The start/end detector 137 also stops the transmission of the target drive torque $T_{OS}$ to the ECU 15, and operates the switch 103 to select a higher one of the two rear wheel speeds $V_{RL}$, $V_{RR}$ as a vehicle speed $V_S$.

(f) The condition that the target drive torque $T_{OS}$ is equal to or higher than the demanded drive torque $T_d$, and the slip s is equal to or smaller than a constant value, e.g., $-2$ km/hour, continues for a certain period of time, such as 0.5 second, for example.

(g) The condition that the idling switch 68 has been turned on, i.e., the driver has released the accelerator pedal 31, continues for a certain period of time, such as 0.5 second, for example.

Figure 17:
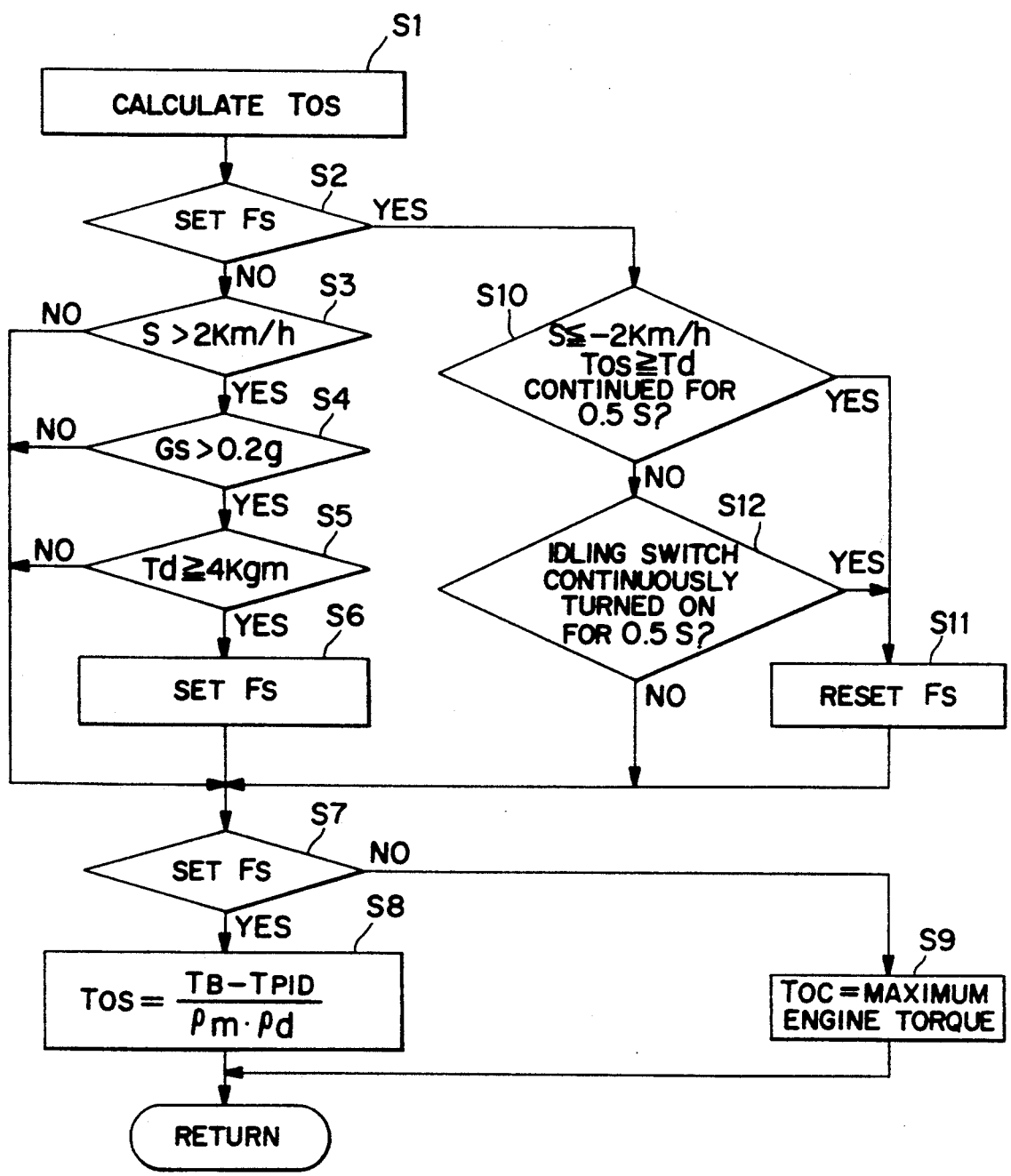
FIG. 17 is a flowchart of a slip control process.

The motor vehicle 81 has a manual switch (not shown) with which the driver can select the slip control process. When the driver operates on the manual switch to select the slip control process, the following slip control process is carried out:

The slip control process is shown in the flowchart of FIG. 17. As shown in FIG. 17, the TCL 75 calculates the target drive torque $T_{OS}$ through the detection of various data and calculation steps, as described above, in a step S1. The calculation of the target drive torque $T_{OS}$ is effected irrespective of the operation of the manual switch.

Then, the TCL 75 determines whether the slip control flag $F_S$ is set or not in a step S2. Since the slip control flag $F_S$ is not initially set, the TCL 75 determines, in a step S3, whether the slip s of the front wheels 64, 65 is larger than a predetermined threshold value, e.g., 2 km/hour, or not. If the slip s is larger than 2 km/hour in the step S3, then the TCL 75 determines, in a step S4, whether the rate of change $G_s$ of the slip s is larger than 0.2 g or not.

If the rate of change $G_s$ is larger than 0.2 g in the step S4, then the TCL 75 determines, in a step S5, whether or not the drive torque $T_d$ demanded by the driver is equal to or greater than a minimum drive torque, e.g., 4 kgm, required to cause the motor vehicle 81 to run, i.e., whether the driver intends to run the motor vehicle 81 or not.

If the demanded drive torque $T_d$ is equal to or greater than 4 kgm in the step S5, then the TCL 75 sets the slip control flag $F_S$ in a step S6, and determines again whether the slip control flag $F_S$ is set or not in a step S7.

If the slip control flag $F_S$ is set in the step S7, then the TCL 75 employs the target drive torque $T_{OS}$ for the slip control torque, which has been calculated according to the equation (7), as the target drive torque $T_{OS}$ for the engine 11, in a step S8.

If the slip control flag $F_S$ is reset in the step S7, then the TCL 75 employs the maximum torque of the engine 11 as the target drive torque $T_{OS}$ in a step S9. Since the ECU 15 reduces the duty ratio of the torque control solenoid-operated valves 51, 56 to 0%, the engine 11 produces a drive torque depending on the depression by the driver of the accelerator pedal 31.

If the slip s of the front wheels 64, 65 is smaller than 2 km/hour in the step S3, or if the rate of change $G_s$ of the slip s is smaller than 0.2 g in the step S4, or if the demanded drive torque $T_d$ is smaller than 4 kgm in the step S5, then control jumps to the step S7. The TCL 75 employs the maximum torque of the engine 11 as the target drive torque $T_{OS}$ in the step S9, and the ECU 15 reduces the duty ratio of the torque control solenoid-operated valves 1, 56 to 0%, with the result that the engine 11 produces a drive torque depending on the depression by the driver of the accelerator pedal 31.

If the slip control flag FS is set in the step S2, the TCL 75 determines, in a step S10, whether the condition that the slip s of the front wheels 64, 65 is equal to or smaller than −2 km/hour and the demanded drive torque $T_d$ is equal to or smaller than the target drive torque $T_{OS}$ calculated in the step S1, and continues for 0.5 second or not.

If the condition that the slip s of the front wheels 64, 65 is equal to or smaller than −2 km/hour and the demanded drive torque $T_d$ is equal to or smaller than the target drive torque $T_{OS}$ calculated in the step S1, and continues for 0.5 second in the step S10, i.e., if the driver does not want to accelerate the motor vehicle 81, then the TCL 75 resets the slip control flag $F_S$ in a step S11, from which control goes to the step S7.

If the condition that the slip s of the front wheels 64, 65 is equal to or smaller than −2 km/hour and the demanded drive torque $T_d$ is equal to or smaller than the target drive torque $T_{OS}$ calculated in the step S1, and does not continue for 0.5 second in the step S10, i.e., if the driver wants to accelerate the motor vehicle 81, then the TCL 75 determines, in a step S12, whether the idling switch 68 is turned on or not, i.e., whether the fully closed condition of the throttle valve 20 continues, for 0.5 second or not.

If the idling switch 68 is turned on in the step S12, then since the driver does not step on the accelerator pedal 31, control goes to the step S11 in which the slip control flag $F_S$ is reset. Conversely, if the idling switch 68 is turned off in the step S12, then since the driver is stepping on the accelerator pedal 31, control goes from the step S12 to the step S7.

For the turn control process for the motor vehicle 81, the TCL 75 calculates a demanded lateral acceleration $G_{YO}$ for the motor vehicle 81 from the steering shaft angular position $\delta_H$ and the vehicle speed V, and establishes an acceleration in the longitudinal direction of the motor vehicle 81 such that the motor vehicle 81 will not have an extreme understeer response, i.e., a target longitudinal acceleration $G_{XO}$, based on the target lateral acceleration $G_{YO}$. Then, the TCL 75 calculates a target drive torque $T_{OC}$ for the engine 11 which corresponds to the target longitudinal acceleration $G_{XO}$.

If the target drive torque $T_{OC}$ which is established for the engine 11 in each period of 15 milliseconds increases and decreases by a large amount, shocks are produced by acceleration and deceleration of the motor vehicle 81, which reduces the riding comfort of the motor vehicle 81. In view of such a problem, when the target drive torque $T_{OC}$ for the engine increases and decreases to the extent which reduces the riding comfort of the motor vehicle 81, it is necessary to limit the amount by which the target drive torque $T_{OC}$ increases or decreases.

Figure 18:
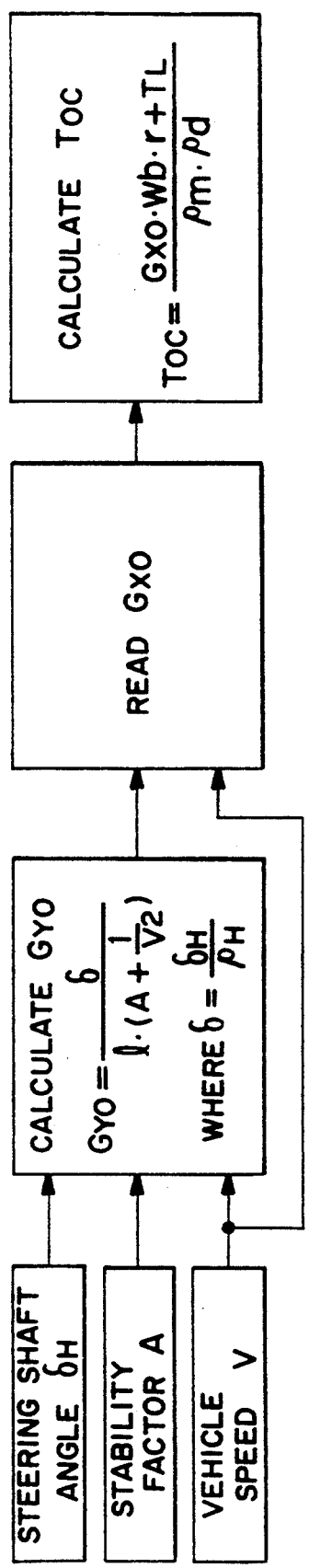
FIG. 18 is a block diagram illustrating a procedure for calculating a target drive torque for a turn control process.

FIG. 18 shows in a block form a calculating procedure for the turn control process, which is designed to meet the above requirement. The TCL 75 calculates the vehicle speed V according to the equation (1) from the output signals from the rear wheel speed sensors 79, 80, and also calculates the steering angle $\delta$ of the front wheels 64, 65 according to the equation (2) based on the detected signal from the steering angle sensor 83. The TCL 75 calculates a demanded lateral acceleration $G_{YO}$ at this time according to the equation (3).

The stability factor A is of a value determined depending on the structure of the suspensions of the motor vehicle 81, the properties of the tires, or the road condition. More specifically, the stability factor A is expressed as the gradient of a tangent line in the graph of FIG. 19 which shows the relationship between the actual lateral acceleration $G_Y$ which is applied to the motor vehicle 81 upon a normal circular turn and the steering angle ratio $\delta_H/\delta_{HO}$ of the steering shaft 82 at this time (i.e., the ratio of the angle $\delta_H$ of the steering shaft 82 upon acceleration to the angle $\delta_{HO}$ thereof while the motor vehicle 81 is running at a very low speed when the lateral acceleration $G_Y$ is nearly 0). In a range in which the lateral acceleration $G_Y$ is small and the vehicle speed V is not very high, the stability factor A is of a substantially constant value ($=0.002$). When the lateral acceleration $G_Y$ exceeds 0.6 g, the stability factor A greatly increases, causing the motor vehicle 81 to exhibit a very strong understeer response.

Figure 19:
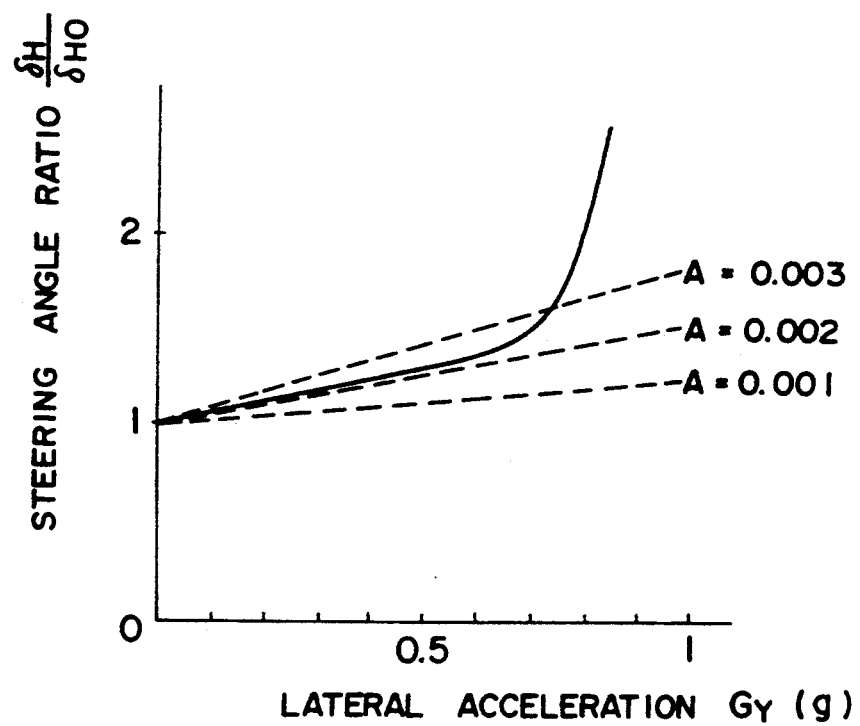
FIG. 19 is a graph showing a map which indicates the relationship between a lateral acceleration and a steering angle ratio for the explanation of a stability factor.

On the basis of the map shown in FIG. 19, the stability factor A is set to 0.002, and the drive torque of the engine 11 is controlled so that the demanded lateral acceleration $G_{YO}$ for the motor vehicle 81, which is calculated according to the equation (3), will be less than 0.6 g.

For a slippery road such as an ice-covered road, the stability factor A may be set to about 0.005, for example.

Figure 20:
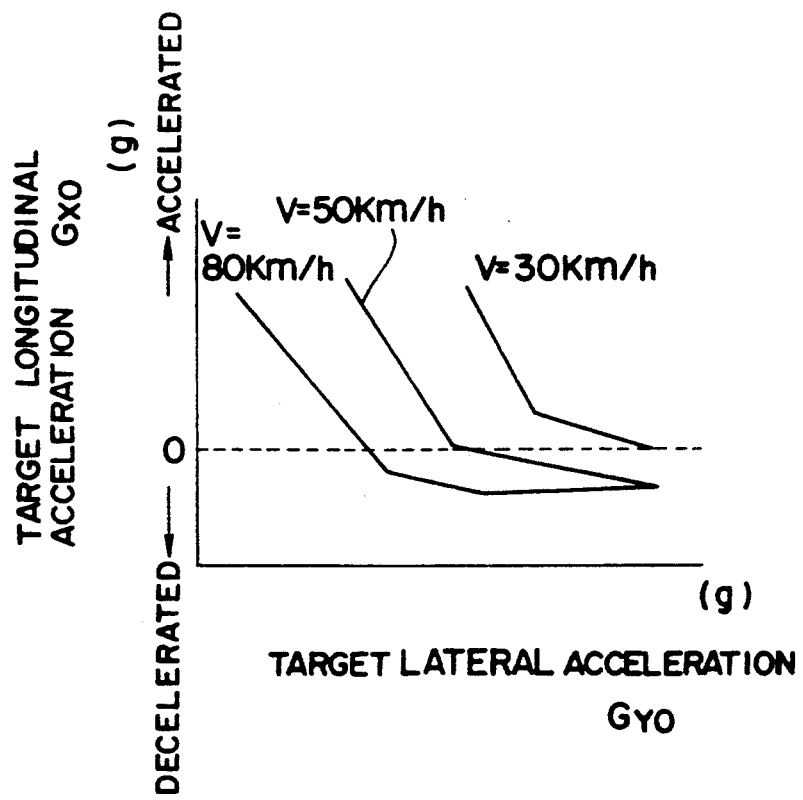
FIG. 20 is a graph showing a map which indicates the relationship between a target lateral acceleration, a target longitudinal acceleration, and a vehicle speed.
Figure 21:
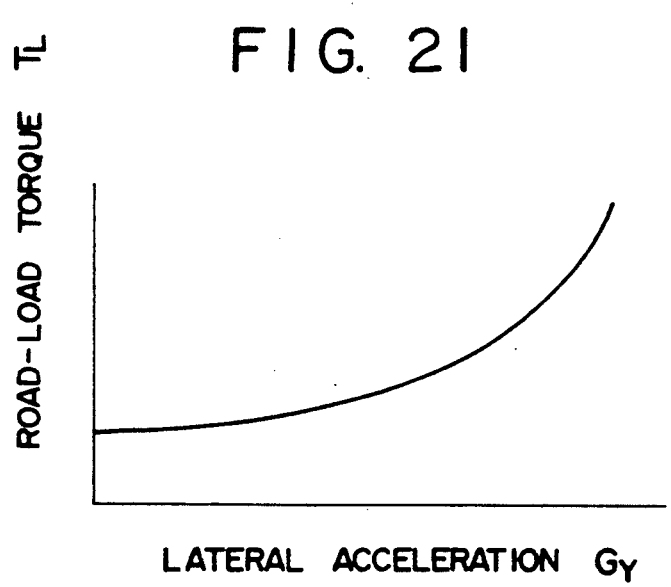
FIG. 21 is a graph showing the relationship between a lateral acceleration and a road-load torque.

After the demanded lateral acceleration $G_{YO}$ has been calculated, the target longitudinal acceleration $G_{XO}$ for the motor vehicle 82, which has been established depending on the magnitude of the demanded lateral acceleration $G_{YO}$ and the vehicle speed V, is read from a map shown in FIG. 20, which is stored in the TCL 75. Then, the target drive torque $T_{OC}$ of the engine 11 which corresponds to the target longitudinal acceleration $G_{XO}$ is calculated according to the following equation (8):

$$T_{OC} = \frac{G_{XO} \cdot W_b \cdot r + T_L}{pm \cdot pd} \quad (8)$$

where $T_L$ is the road-load torque which is the resistance from the road surface and is determined as a function of the lateral acceleration $G_Y$ of the motor vehicle 81. The road-load torque $T_L$ is determined from a map shown in FIG. 21 in this embodiment.

The motor vehicle 81 has a manual switch (not shown) with which the driver can select the turn control process. When the driver operates on the manual switch to select the slip control process, the turn control process is carried out which is described as follows.

Figure 22:
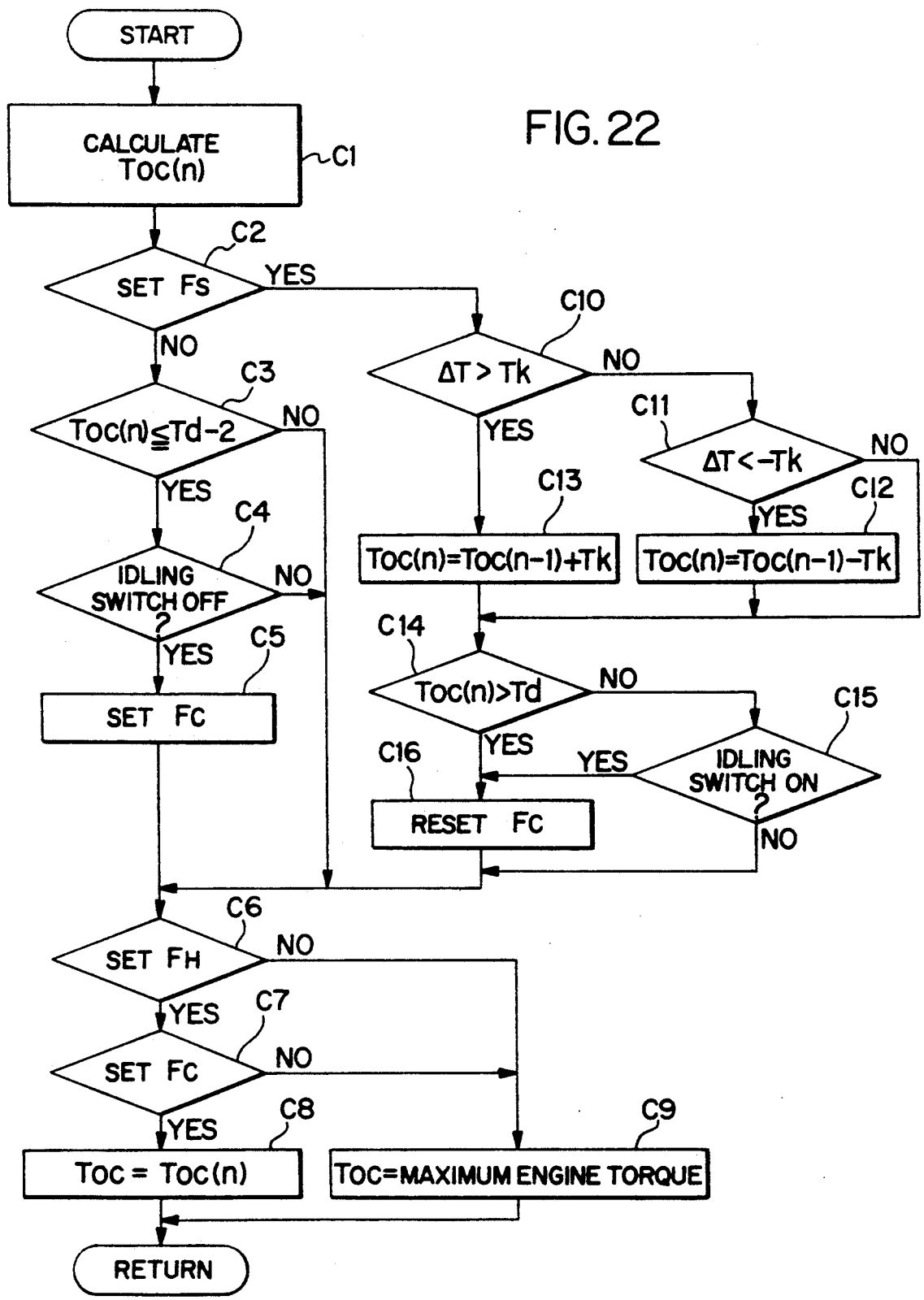
FIG. 22 is a flowchart of a turn control process.

FIG. 22 shows a control sequence for determining a target drive torque $T_{OC}$ for the turn control process. As shown in FIG. 22, the TCL 75 calculates a target drive torque $T_{OC(n)}$ through the detection of various data and calculation steps, as described above, in a step C1. The calculation of the target drive torque $T_{OC(n)}$ is effected irrespective of the operation of the manual switch.

Then, the TCL 75 determines whether the motor vehicle 81 is in the turn control process, i.e., whether the turn control flag $F_C$ is set or not in a step C2. Since the motor vehicle 81 is not in the turn control process at first, the turn control flag $F_C$ is reset, and the TCL 75 determines, in a step C3, whether or not the target drive torque $T_{OC(n)}$ is equal to or smaller than $(T_{d-2})$, for example. Although a target drive torque $T_{OC}$ can be calculated while the motor vehicle 81 is running straight, its value is normally larger than the demanded drive torque $T_d$. Since the demanded drive toque $T_d$ generally becomes smaller when the motor vehicle 81 makes a turn, the turn control process is started if the target drive torque $T_{OC}$ is equal to or smaller than the threshold value $(T_{d-2})$.

The threshold value is selected to be $(T_{d-2})$ to provide a hysteresis property for preventing any hunting in the turn control process.

If the target drive torque $T_{OC(n)}$ is equal to or smaller than the threshold value $(T_{d-2})$ in the step C3, then the TCL 75 determines whether the idling switch 68 is turned off or not in a step C4.

If the idling switch 68 is turned off in the step C4, i.e.., if the accelerator pedal 31 is stepped on by the driver, then the TCL 75 sets the turn control flag $F_C$ in a step C5. Then, the TCL 75 determines, in a step C6, whether the steering angle neutral position learned flags $F_H$ is set or not, i.e., whether the steering angle $\delta$ detected by the steering angle sensor 83 is reliable or not.

If the steering angle neutral position learned flag $F_H$ is set in the step C6, then the TCL 75 determines again whether the turn control flag $F_C$ is set or not in a step C7.

In the above process, since the turn control flag $F_C$ has been set in the step C5, the step C7 determines that the turn control flag $F_C$ is set. Then, the TCL 75 employs the target drive torque $T_{OC(n)}$, which has been calculated according to the equation (8), as a target drive torque $T_{OC}$ for the turn control process.

If the steering angle neutral position learned flag $F_H$ is not set in the step C6, since the steering angle $\delta$ calculated according to the equation (2) is not reliable, the target drive torque $T_{OC}$ calculated according to the equation (8) is not employed. The TCL 75 employs the maximum torque of the engine 11 as the target drive torque $T_{OC}$ in a step C9. Since the ECU 15 reduces the duty ratio of the torque control solenoid-operated valves 51, 56 to 0%, the engine 11 produces a drive torque depending on the depression by the driver of the accelerator pedal 31.

If the target drive torque $T_{OC(n)}$ is larger than $(T_{d-2})$ in the step C3, then control does not go to the turn control process, but goes from the step C6 or C7 to the step C9. In the step C9, the ECU 15 reduces the duty ratio of the torque control solenoid-operated valves 51, 56 to 0%, so that the engine 11 produces a drive torque depending o the depression by the driver of the accelerator pedal 31.

If the idling switch 68 is turned on in the step C4, i.e., if the accelerator pedal 31 is not stepped on by the driver, then the TCL 75 also employs the maximum torque of the engine 11 as the target drive torque $T_{OC}$ in the step C9. Since the ECU 15 reduces the duty ratio of the torque control solenoid-operated valves 51, 56 to 0%, the engine 11 produces a drive torque depending on the depression by the driver of the accelerator pedal 31. Therefore, no turn control process is carried out.

If the turn control flag $F_C$ is set in the step C2, then the TCL 75 determines, in a step C10, whether the difference $\Delta T$ between the presently calculated target drive torque $T_{OC(n)}$ and the previously calculated target drive torque $T_{OC(n-1)}$ is larger than an allowable amount $T_K$ of torque increase and decrease. The allowable amount $T_K$ is an amount of torque which is small enough not to allow the driver and passengers to feel shocks upon acceleration and deceleration of the motor vehicle 81. If the target longitudinal acceleration $G_{XO}$ of the motor vehicle 81 is to be reduced to 0.1 g per second, then, using the equation (8), the allowable amount $T_K$ is given as:

$$T_K = 0.1 \cdot \frac{W_b \cdot r}{pm \cdot pd} \cdot \Delta t$$

If the difference $\Delta T$ between the presently calculated target drive torque $T_{OC(n)}$ and the previously calculated target drive torque $T_{OC(n-1)}$ is not larger than the allowable amount $T_K$ of torque increase and decrease in the step C10, then the TCL 75 determines, in a step C11, whether the difference $\Delta T$ between the presently calculated target drive torque $T_{OC(n)}$ and the previously calculated target drive torque $T_{OC(n-1)}$ is larger than a negative allowable amount $T_K$ of torque increase and decrease.

If the difference $\Delta T$ between the presently calculated target drive torque $T_{OC(n)}$ and the previously calculated target drive torque $T_{OC(n-1)}$ is larger than the negative allowable amount $T_K$ of torque increase and decrease in the step C11, then since the absolute value $|\Delta T|$ of the difference between the presently calculated target drive torque $T_{OC(n)}$ and the previously calculated target drive torque $T_{OC(n-1)}$ is smaller than the allowable amount $T_K$ of torque increase and decrease, the presently calculated target drive torque $T_{OC(n)}$ is employed as it is when control reaches the step C8.

If, however, the difference ΔT between the presently calculated target drive torque $T_{OC(n)}$ and the previously calculated target drive torque $T_{OC(n-1)}$ is not larger than the negative allowable amount $T_K$ of torque increase and decrease, then the present target drive torque $T_{OC(n)}$ is established, in a step C12, according to the following equation when control reaches the step C8:

$$T_{OC(n)} = T_{OC(n-1)} - T_K.$$

Thus, a reduction in the previously calculated target drive torque $T_{OC(n-1)}$ is limited by the allowable amount $T_K$ of torque increase and decrease, thereby reducing a deceleration shock produced when the drive torque of the engine 11 is reduced.

If the difference ΔT between the presently calculated target drive torque $T_{OC(n)}$ and the previously calculated target drive torque $T_{OC(n-1)}$ is larger than the allowable amount $T_K$ of torque increase and decrease, then the present target drive torque $T_{OC(n)}$ is established, in a step C13, according to the following equation when control reaches the step C8:

$$T_{OC(n)} = T_{OC(n-1)} + T_K.$$

Therefore, if the difference ΔT between the presently calculated target drive torque $T_{OC(n)}$ and the previously calculated target drive torque $T_{OC(n-1)}$ exceeds the allowable amount $T_K$ of torque increase and decrease, then an increase in the previously calculated target drive torque $T_{OC(n-1)}$ is limited by the allowable amount $T_K$ of torque increase and decrease, thereby reducing an acceleration shock produced when the drive torque of the engine 11 is increased.

After the present target drive torque $T_{OC(n)}$ is established, the TCL 75 determines whether the target drive torque $T_{OC(n)}$ is larger than the drive torque $T_d$ demanded by the driver in a step C14.

In the case where the turn control flag $F_C$ is set, since the target drive torque $T_{OC(n)}$ is not larger than the demanded drive torque $T_d$, the TCL 76 then determines whether the idling switch 68 is turned on or not in a step C15.

If the idling switch 68 is not turned on in the step C15, then since the motor vehicle 82 requires the turn control process, control goes to the step C6.

If the target drive torque $T_{OC(n)}$ is larger than the demanded drive torque $T_d$ in the step C14, then since the turn control process is finished, the TCL 75 resets the turn control flag $F_C$ in a step C16. If the idling switch 68 is turned on in the step C15, then since the accelerator pedal 81 is not stepped on, control goes from the step C15 to the step C16 in which the turn control flag $F_C$ is reset.

When the turn control flag $F_C$ is reset in the step C16, the TCL 75 employs the maximum torque of the engine 11 as the target drive torque $T_{OC}$, and the ECU 15 reduces the duty ratio of the torque control solenoid-operated valves 51, 56 to 0%, the engine 11 produces a drive torque depending on the depression by the driver of the accelerator pedal 31.

After the target drive torque $T_{OC}$ for the turn control process has been calculated, the TCL 75 selects an 1 optimum final target drive torque $T_O$ from these two target drive torques $T_{OS}$, $T_{OC}$, and transmits the selected optimum final target drive torque $T_O$ to the ECU 15. In view of safety of the motor vehicle 81 as it runs, the TCL 76 transmits the target drive torque of the smallest numerical value with priority to the ECU 15. Since, however, the target drive torque $T_{OS}$ for the slip control process is generally smaller at all times than the target drive torque $T_{OL}$ for the turn control process, the final target drive torque $T_O$ may be selected in the order of the slip control process and the turn control process.

Figure 23:
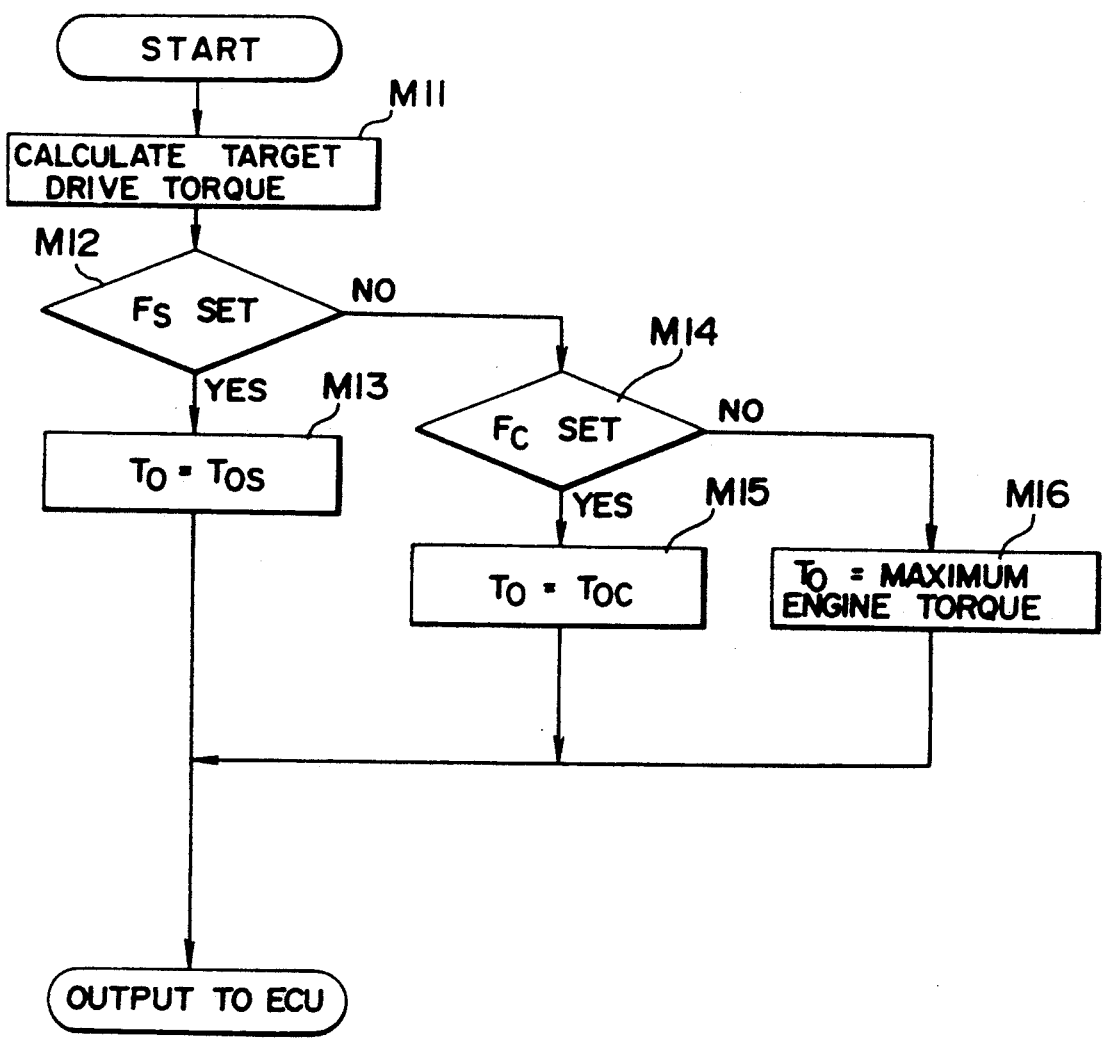
FIG. 23 is a flowchart of a process for selecting a final target torque.

The process for selecting a final target drive torque from the target drive torques $T_{OS}$, $T_{OC}$ is shown in FIG. 23. In FIG. 23, the target drive torque $T_{OS}$ for the slip control process and the target drive torque $T_{OC}$ for the turn control process are calculated in a step M11. Then, a step M12 determines whether the slip control flag $F_S$ is set or not. If the slip control flag $F_S$ is set, then the target drive torque $T_{OS}$ for the slip control process is selected as a final target drive torque $T_O$ in a step M13, and is transmitted to the ECU 15.

If the slip control flag $F_S$ is not set in the step M12, then a step M14 determines whether the turn control flag $F_C$ is set or not. If the turn control flag $F_C$ is set, then the target drive torque $T_{OC}$ for the turn control process is selected as a final target drive torque $T_O$ in a step M15, and is transmitted to the ECU 15.

If the turn control flag $F_C$ is not set in the step M14, then the TCL 75 transmits the maximum drive torque of the engine 11 as a final target drive torque $T_O$ to the ECU 15.

In addition to selecting the final target drive torque $T_O$, when the motor vehicle 81 is started quickly that the output power of the engine 11 cannot be reduced quickly enough by fully closing the throttle valve 20 through the actuator 41 or when the road varies from a normal dry road to an ice-covered road, the TCL 75 establishes a retard ratio with respect to the basic retard $P_B$ of the ignition timing P which is established by the ECU 15, and transmits the retard ratio to the ECU 15.

The basic retard $P_B$ is a maximum retard which does not obstruct the normal operation of the engine 11, and is determined on the basis of the rate of intake air supplied to the engine 11 and the engine speed $N_E$. In the present embodiment, there are four retard ratios, i.e., a level 0 for setting the basic retard $P_B$ to 0, a level I for compressing the basic retard $P_B$ to ⅓, a level II for outputting the basic retard $P_B$ as it is, and a level III for outputting the basic retard $P_B$ as it is and fully closing the throttle valve 20. Basically, as the rate of change $G_s$ of the slip s goes larger, the retard ratio is selected such that it makes the retard larger.

Figure 24:
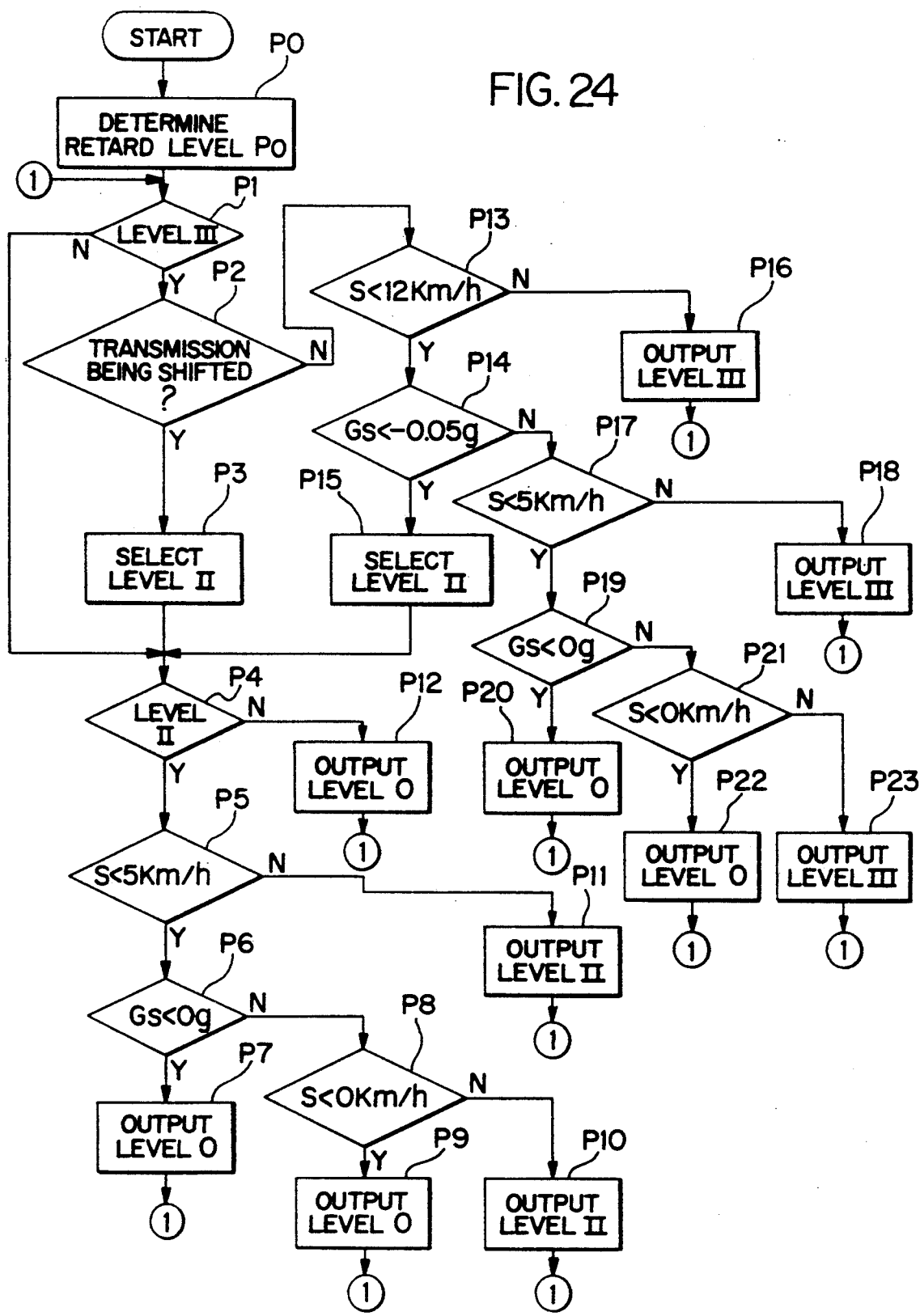
FIG. 24 is a flowchart of a process for selecting a retard ratio.
Figure 27:
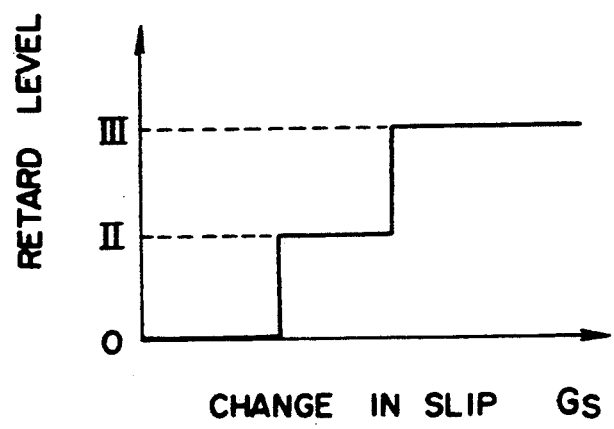
FIG. 27 is a diagram showing a map which indicates the relationship between a retard level and a change in slip.

FIG. 24 shows a process for selecting a retard ratio. The TCL 75 first determines a retard level based on the change $G_s$ in slip in a step P1. Specifically, a retard level is read from a retard level map shown in FIG. 27 based on the change $G_s$ in slip. The TCL 75 then determines whether the retard ratio is the level III or not in a step P1. If the retard ratio is the level III, then the TCL 75 determines in a step P2 whether the hydraulic automatic transmission 13 is being controlled by the hydraulic control device 16 to shift gear positions.

If the hydraulic automatic transmission 13 is shifting gear positions in the step P2, then in order to prevent the engine 11 from stalling due to an excessive reduction in the output power, the retard ratio is reset to the level II in a step P3, and then a step P4 determines whether the retard ratio is the level II or not. Since the retard ratio is the level II in the step P4, a step P5 then determines whether the slip s of the front wheels 64, 65 is less than 5 km/hour. If the slip s is less than 5 km/hour in the step P5, i.e., if the front wheels 64, 65 are not essentially slipping, then the TCL 75 determines whether or not the rate of change $G_s$ of the slip s is smaller than 0 g in a step P6.

If the rate of change $G_s$ of the slip s is smaller than 0 g in the step P6, then the TCL 75 sets the retard ratio to the level 0 and outputs the level 0 to the ECU 15 in a step P7. Conversely, if the rate of change $G_s$ of the slip s is equal to or larger than 0 g in the step P6, then the TCL 75 determines in a step P8 whether the slip s of the front wheels 64, 65 is smaller than 0 km/hour.

If the slip s is less than 0 km/hour in the step P8, then the TCL 75 resets the retard ratio to the level 0 and outputs the level 0 to the ECU 15 in a step P9. Conversely, if the slip s is higher than 0 km/hour in the step P8, i.e., if the front wheels 64, 65 are slipping more or less, then the TCL 75 keeps the retard ratio at the level II and outputs the level II to the ECU 15 in a step P10.

If the slip s is larger than 5 km/hour in the step P5, i.e., if the front wheels 64, 65 are slipping, then the TCL 75 outputs the retard ratio of the level II to the ECU 15 in a step P11. If the retard ratio is not the level III in the step P1, then control goes to the step P4. If the retard ratio is not the level II in the step P4, the TCL 75 outputs the retard ratio of the level 0 to the ECU 15 in a step P12.

If the hydraulic automatic transmission 13 is not shifting gears in the step P2, then the TCL 75 determines in a step P13 whether the slip s of the front wheels 64, 65 is less than 12 km/hour in a step P13. If the slip s is less than 12 km/hour in the step P13, then the TCL 75 determines in a step P14 whether the rate of change $G_s$ of the slip s is smaller than $-0.05$ g or not. If the rate of change $G_s$ of the slip s is smaller than $-0.05$ g in the step P14, then the TCL 75 resets the retard ratio to the level II, and control goes to the step P4.

If the slip s of the front wheels 64, 65 is greater than 12 km/hour, i.e., the front wheels 64, 65 are slipping to a large extent, in the step P13, then the TCL 75 keeps the retard ratio at the level III and outputs the level III to the ECU 15 in a step P16. If the rate of change $G_s$ of the slip s is larger than $-0.05$ g, i.e., if the slip tends to increase, in the step P14, then the TCL 75 determines in a step P17 whether the slip s is less than 5 km/hour or not.

If the slip s is greater than 5 km/hour in the step P17, i.e., if the step s is greater than 5 km/hour and smaller than 12 km/hour, then the TCL 75 keeps the retard ratio at the level III and outputs the level III to the ECU 15 in a step P18. If the slip s is less than 5 km/hour in the step P17, then the TCL 75 determines in a step P19 whether the rate of change $G_s$ of the slip s is smaller than 0 g or not, i.e., whether the motor vehicle 81 is being decelerated.

If the rate of change $G_s$ of the slip s is less than 0 g in the step P19, then since the motor vehicle 81 is not accelerated, then the TCL 75 resets the retard ratio to the level 0 and outputs the level 0 to the ECU 15 in a step P20. If the rate of change $G_s$ of the slip s is greater than 0 g in the step P19, i.e., if the motor vehicle 81 is being accelerated, then the TCL 75 determines in a step P21 whether the slip s is less than 0 km/hour.

If the slip s is less than 0 km/hour in the step P21, i.e., if no slip is produced, then the TCL 75 resets the retard ratio to the level 0 and outputs the level 0 to the ECU 15 in a step P22. Conversely, if the slip s is higher than 0 km/hour in the step P21, then since the slip may possibly increase, the TCL 75 keeps the retard ratio at the level III and outputs the level III to the ECU 15 in a step P23.

The ECU 15 has a map (not shown) storing the relationship between the ignition timing P determined based on the engine speed $N_E$ and the rate of intake air supplied to the engine 11, and the basic retard $P_B$. The ECU 15 reads the ignition timing P and the basic retard $P_B$ from the map based on the detected signal from the crankshaft angle sensor 62 and the detected signal from the air flow sensor, and then corrects the ignition timing P and the basic retard $P_B$ thus read, based on the retard ratio from the TCL 75, thereby providing a target retard $P_O$. An upper limit for the target retard $P_O$ is established which corresponds to an upper limit temperature for exhaust gases that is low enough not to damage the catalyst for purifying the exhaust gases. The temperature of the exhaust gases is determined by the detected signal from the exhaust temperature sensor 74.

When the temperature of the coolant of the engine 11 which is detected by the coolant temperature sensor 71 is lower than a predetermined value, the process for retarding the ignition timing P, described below, is interrupted since retarding the ignition timing P would induce knocking or stalling of the engine 11.

Figure 25:
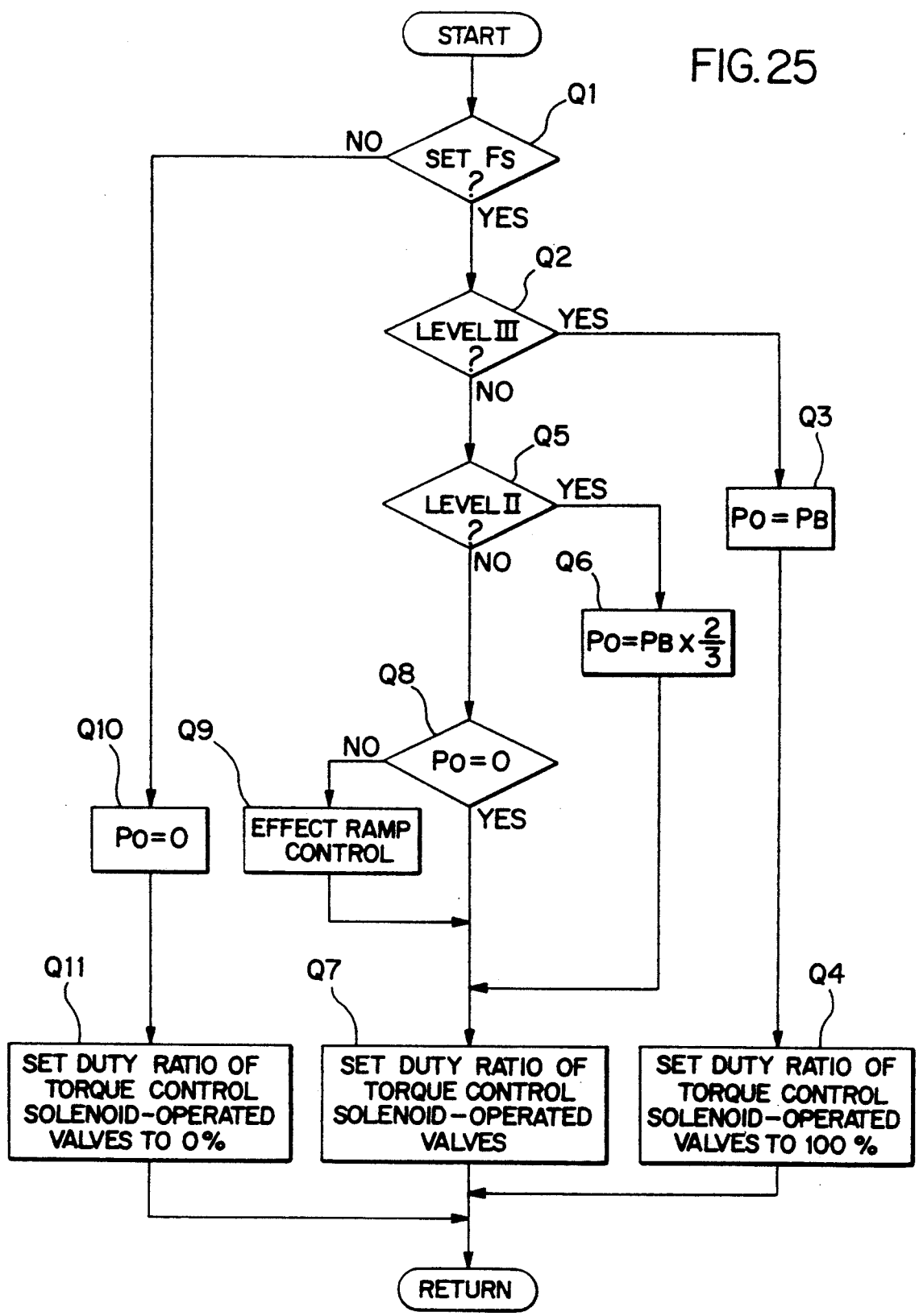
FIG. 25 is a flowchart of a process for controlling the output power of an engine.

FIG. 25 shows a procedure for calculating the target retard $P_O$ in the above retard control process. First, the ECU 15 determines whether the slip control flag $F_S$ is set or not in a step Q1. If the slip control flag $F_S$ is set in the step Q1, then the ECU 15 determines whether the retard ratio is set to the level III in a step Q2.

If the retard ratio is the level III in the step Q2, then the ECU 15 employs the basic retard $P_B$, read from the map, as the target retard $P_O$, which retards the ignition timing P by the target retard $P_O$ in a step Q3. Then, in order that the throttle valve 20 is fully closed irrespective of the final target drive torque $T_O$, the ECU 15 sets the duty ratio of the torque control solenoid-operated valves 51, 56 to 100%, forcibly causing the engine 11 to idle in a step Q4.

If the retard ratio is not the level III in the step Q2, then the ECU 15 determines whether the retard ratio is set to the level II in a step Q5. If the retard ratio is the level II in the step Q5, then the ECU 15 establishes the target retard $P_O$, according to the equation below, and retards the ignition timing P by the target retard $P_O$:

$$P_O = P_B \cdot \tfrac{2}{3}$$

Then, the ECU 15 sets the duty ratio of the torque control solenoid-operated valves 51, 56 depending on the target drive torque $T_{OS}$, reducing the drive torque of the engine 11 irrespective of the depression by the driver of the accelerator pedal 31, in a step Q7.

The ECU 15 stores a map for determining a throttle opening $\theta_T$ using the engine speed $N_E$ and the drive torque of the engine 11 as parameters. The ECU 15 reads a target throttle opening $\theta_{TO}$ corresponding to the present engine speed $N_E$ and the target drive torque $T_{OS}$, from the map.

Then, the ECU 15 determines the difference between the target throttle opening $\theta_{TO}$ and the actual throttle opening $\theta_T$ detected by the throttle opening sensor 67. The ECU 15 sets the duty ratio of the torque control solenoidoperated valves 51, 56 to a value commensurate with the difference, and energizes the solenoids of the torque control solenoid-operated valves 51, 56 at the duty ratio, thereby operating the actuator 41 to lower the actual throttle opening $\theta_T$ to the target value $\theta_{TO}$.

If the maximum torque of the engine 11 is outputted as the target drive torque $T_{OS}$ to the ECU 15, then the ECU 15 lowers the duty ratio of the torque control solenoid-operated valves 51, 56 to 0%, causing the engine 11 to generate the drive torque depending on the depression by the driver of the accelerator pedal 31.

If the retard ratio is not the level II in the step Q5, then the ECU 15 determines whether the target retard $P_O$ is 0 or not in a step Q8. If the target retard $P_O$ is 0, then control goes to a step Q7 in which the ECU 15 does not retard the ignition timing P, but sets the duty ratio of the torque control solenoid-operated valves 51, 56 depending on the target drive torque $T_{OS}$, which reduces the drive torque of the engine 11 irrespective of the depression by the driver of the accelerator pedal 31.

If the target retard $P_O$ is not 0 in the step Q8, the ECU 15 reduces the target retard $P_O$ one degree in each sampling period $\Delta t$ of the main timer until $P_{O=}0$ through ramp control in a step Q9. The ramp control is effected because if the target retard $P_O$ were immediately reduced to 0, the drive torque produced by the engine 11 would vary greatly, resulting in shocks. Then, control goes to the step Q7.

If the slip control flag $F_S$ is reset in the step Q1, then the ECU 15 carries out a normal running control process in which the drive torque of the engine 11 is not reduced. The ECU 15 sets the target retard $P_O$ to 0, thus the ignition timing P is not retarded in a step Q10, and then sets the duty ratio of the torque control solenoid-operated valves 51, 56 to 0% in a step Q11, allowing the engine 11 to produce a the accelerator pedal 31.

Although certain preferred embodiments have been shown and described, it should be understood that many changes and modifications may be made therein without departing from the scope of the appended claims.

What is claimed is:

1. A system for controlling the output power of a motor vehicle having an engine and drive wheels drivable by the engine, comprising:
   torque control means for reducing the drive torque produced by the engine irrespective of controlling action of the driver of the motor vehicle;
   target drive wheel speed setting means for establishing a target speed for the drive wheels based on a running speed of the motor vehicle;
   reference drive torque setting means for establishing a reference drive torque for the engine depending on said target speed for the drive wheels;
   slip detecting means for detecting a slip of the drive wheels based on said target speed for the drive wheels;
   target drive torque setting means for establishing a target drive torque for the engine based on said reference drive torque and said slip of the drive wheels; and
   electronic control means for controlling said torque control means to equalize the drive torque produced by the engine to said target drive torque.

2. A system according to claim 1, wherein said target drive torque setting means comprises corrective torque calculating means for calculating a corrective torque based on the slip of the drive wheels and correcting said reference drive torque with the corrective torque, thereby establishing said target drive torque.

3. A system according to claim 2, wherein said corrective torque is set based on at least one of a proportional value, a differentiated value, and an integrated value of said slip.

4. A system according to claim 1, wherein said reference drive torque setting means comprises setting means for setting said reference drive torque to a value between predetermined upper and lower limit values.

5. A system according to claim 1, wherein said reference drive torque setting means comprises reference drive wheel acceleration calculating means for calculating a reference acceleration for the drive wheels based on said target speed for the drive wheels, and reference drive torque calculating means for calculating said reference drive torque based on said reference acceleration for the drive torque.

6. A system according to claim 1, further including accelerating condition detecting means for detecting an accelerating condition of the motor vehicle, said reference drive torque setting means comprising reference drive torque correcting means for correcting said reference drive torque depending on the accelerating condition detected by said accelerating condition detecting means.

7. A system according to claim 6, wherein said reference drive torque setting means comprises reference drive wheel acceleration calculating means for calculating a reference acceleration for the drive wheels based on said target speed for the drive wheels, reference acceleration correcting means for correcting said reference acceleration for the drive wheels depending on the acceleration condition detected by said accelerating condition detecting means, and reference drive torque calculating means for calculating said reference drive torque based on the corrected reference acceleration for the drive torque.

8. A system according to claim 1, wherein said reference drive torque setting means comprises reference drive torque correcting means for correcting said reference drive torque depending on a running resistance of the motor vehicle.

9. A system according to claim 8, wherein said running resistance comprises different values for a plurality of road surface inclinations, respectively.

10. A system according to claim 1, further including turning condition detecting means for detecting a turning condition of the motor vehicle, said reference drive torque setting means comprising reference drive torque correcting means for correcting said reference drive torque depending on the turning condition detected by said turning condition detecting means.

11. A system according to claim 10, wherein said reference drive torque setting means comprises reference drive wheel acceleration calculating means for calculating a reference acceleration for the drive wheels based on said target speed for the drive wheels, reference acceleration correcting means for correcting said reference acceleration for the drive wheels depending on the acceleration condition detected by said turning condition detecting means, and reference drive torque calculating means for calculating said reference drive torque based on the corrected reference acceleration for the drive torque.

12. A system according to claim 10, wherein said turning condition detecting means comprises lateral acceleration calculating means for calculating a lateral acceleration based on the running speed and a steering angle of the motor vehicle, as information indicative of the turning condition of the motor vehicle.

13. A system according to claim 10, further including turn target drive torque setting means for establishing a turn target drive torque depending on the turning condition detected by said turning condition detecting means when the motor vehicle turns, said target drive torque setting means comprising selecting means for selecting either one of said reference drive torque and said turn target drive torque and establishing the selected torque as said target drive torque.

14. A system according to claim 1, further including turning condition detecting means for detecting a turning condition of the moor vehicle, said target drive wheel speed setting means comprising target speed correcting means for correcting said target speed for the drive wheels based on the turning condition detected by said turning condition detecting means.

15. A system according to claim 14, wherein said turning condition detecting means comprises lateral acceleration calculating means for calculating a lateral acceleration based on the running speed and a steering angle of the motor vehicle, as information indicative of the turning condition of the motor vehicle.

16. A method for controlling the output power of a motor vehicle having an engine and drive wheels drivable by the engine, comprising the steps of:
   (a) establishing a target speed for the drive wheels based on a running speed of the motor vehicle;
   (b) establishing a reference drive torque for the engine depending on said target speed for the drive wheels;
   (c) detecting a slip of the drive wheels based on said target speed for the drive wheels;
   (d) establishing a target drive torque for the engine based on said reference drive torque and said slip of the drive wheels; and
   (e) converging the drive torque produced by the engine to said target drive torque by controlling the drive torque irrespective of controlling action of the drive of the motor vehicle.

17. A method according to claim 1, wherein said step (d) further comprises the steps of calculating a corrective torque based on the slip of the drive wheels and correcting said reference drive torque with the corrective torque, thereby establishing said target drive torque.

18. A method according to claim 17, wherein said corrective torque is set based on at least one of a proportional value, a differentiated value, and an integrated value of said slip.

19. A method according to claim 16, wherein said step (b) further comprises the step of setting said reference drive torque to a value between predetermined upper and lower limit values.

20. A method according to claim 16, wherein said step (b) further comprises the steps of calculating a reference acceleration for the drive wheels based on said target speed for the drive wheels, and calculating said reference drive torque based on said reference acceleration for the drive torque.

21. A method according to claim 16, further comprising the step of:
   (f) detecting an accelerating condition of the motor vehicle; and
   said step (b) further comprises the step of correcting said reference drive torque depending on the accelerating condition detected at said step (f).

22. A method according to claim 21, wherein said step (b) further comprises the steps of calculating a reference acceleration for the drive wheels based on said target speed for the drive wheels, correcting said reference acceleration for the drive wheels depending on the accelerating condition detected at said step (g), and calculating said reference drive torque based on the corrected reference acceleration for the drive torque.

23. A method according to claim 16, wherein said step (b) further comprises the step of correcting said reference drive torque depending on a running resistance of the motor vehicle.

24. A method according to claim 23, wherein said running resistance comprises different values for a plurality of road surface inclinations, respectively.

25. A method according to claim 16, further comprising the step of:
   (f) detecting a turning condition of the motor vehicle; and
   said step (b) further comprises the step of correcting said reference drive torque depending on the turning condition detected at said step (f).

26. A method according to claim 25, wherein said step (b) further comprises the steps of calculating a reference acceleration for the drive wheels based on said target speed for the drive wheels, correcting said reference acceleration for the drive wheels depending on the turning condition detected at said step (f), and calculating said reference drive torque based on the corrected reference acceleration for the drive torque.

27. A method according to claim 25, wherein said step (f) further comprises the step of calculating a lateral acceleration based on the running speed and a steering angle of the motor vehicle, as information indicative of the turning condition of the motor vehicle.

28. A method according to claim 25, further comprising the step of:
   (g) establishing a turn target drive torque depending on the turning condition detected at said step (f) when the motor vehicle turns; and
   said step (d) further comprise the step of selecting either one of said reference drive torque and said turn target drive torque and establishing the selected torque as said target drive torque.

29. A method according to claim 16, further comprising the step of:
   (f) detecting a turning condition of the motor vehicle; and
   said step (a) further comprises the step of correcting said target speed for the drive wheels based on the turning condition detected at said step (f).

30. A method according to claim 29, wherein said step (f) further comprises the step of calculating a lateral acceleration based on the running speed and a steering angle of the motor vehicle, as information indicative of the turning condition of the motor vehicle.

* * * * *